(12) United States Patent
Mii et al.

(10) Patent No.: US 11,171,727 B2
(45) Date of Patent: Nov. 9, 2021

(54) PACKAGE FOR OPTICAL RECEIVER MODULE

(71) Applicant: SUMITOMO ELECTRIC INDUSTRIES, LTD., Osaka (JP)

(72) Inventors: Kazuaki Mii, Osaka (JP); Hiroshi Hara, Osaka (JP)

(73) Assignee: SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 16/908,178

(22) Filed: Jun. 22, 2020

(65) Prior Publication Data
US 2020/0322062 A1 Oct. 8, 2020

Related U.S. Application Data

(63) Continuation of application No. 16/256,060, filed on Jan. 24, 2019.

(30) Foreign Application Priority Data

Jan. 26, 2018 (JP) .............................. JP2018-011674
Apr. 13, 2018 (JP) .............................. JP2018-077539

(51) Int. Cl.
G02B 6/42 (2006.01)
H04B 10/67 (2013.01)
H04J 14/02 (2006.01)
G02B 6/293 (2006.01)

(52) U.S. Cl.
CPC ........... *H04B 10/67* (2013.01); *G02B 6/2938* (2013.01); *G02B 6/4206* (2013.01); *G02B 6/4215* (2013.01); *G02B 6/4248* (2013.01); *G02B 6/4277* (2013.01); *H04J 14/02* (2013.01); *G02B 6/4246* (2013.01)

(58) Field of Classification Search
None
See application file for complete search history.

(56) References Cited

U.S. PATENT DOCUMENTS

| 4,686,530 | A | 8/1987 | Schneider et al. |
|---|---|---|---|
| 6,036,375 | A | 3/2000 | Yanagisawa et al. |
| 6,992,250 | B2 | 1/2006 | Kubota et al. |

(Continued)

OTHER PUBLICATIONS

Notice of Allowance issued for U.S. Appl. No. 16/143,547 dated May 21, 2019.

*Primary Examiner* — Chad H Smith
(74) *Attorney, Agent, or Firm* — Smith, Gambrell & Russell, LLP.

(57) ABSTRACT

A package for an optical receiver module is disclosed. The package includes a housing having electrically conductive walls including a rear wall and a pair of side walls, and a feed-through provided in the rear wall. The feed-through includes an internal portion having an upper rear face and a lower rear face, and an external portion protruding from the upper rear face and the lower rear face outwardly and having a top face and/or a back face continuous to the upper rear face and/or the lower rear face of the internal portion, a first top face, a second back face, and a pair of side faces, the rear face and the side faces connecting the first top face with the second back face, the first top face including DC lines, the second back face including transmission lines, and the transmission lines.

9 Claims, 26 Drawing Sheets

(56) References Cited

U.S. PATENT DOCUMENTS

| | | | | |
|---|---|---|---|---|
| 7,317,742 | B2* | 1/2008 | Saito | G02B 6/4292 |
| | | | | 372/34 |
| 7,426,225 | B2* | 9/2008 | Go | G02B 6/4204 |
| | | | | 372/34 |
| 9,853,414 | B2* | 12/2017 | Wang | H01S 5/0235 |
| 2005/0207092 | A1 | 9/2005 | Kubota et al. | |
| 2015/0365176 | A1* | 12/2015 | Kawamura | H04B 10/676 |
| | | | | 29/825 |
| 2016/0294156 | A1* | 10/2016 | Wang | H01S 5/02216 |
| 2017/0323836 | A1* | 11/2017 | Kawazu | G02B 6/4279 |
| 2019/0094913 | A1 | 3/2019 | Hara | |

* cited by examiner

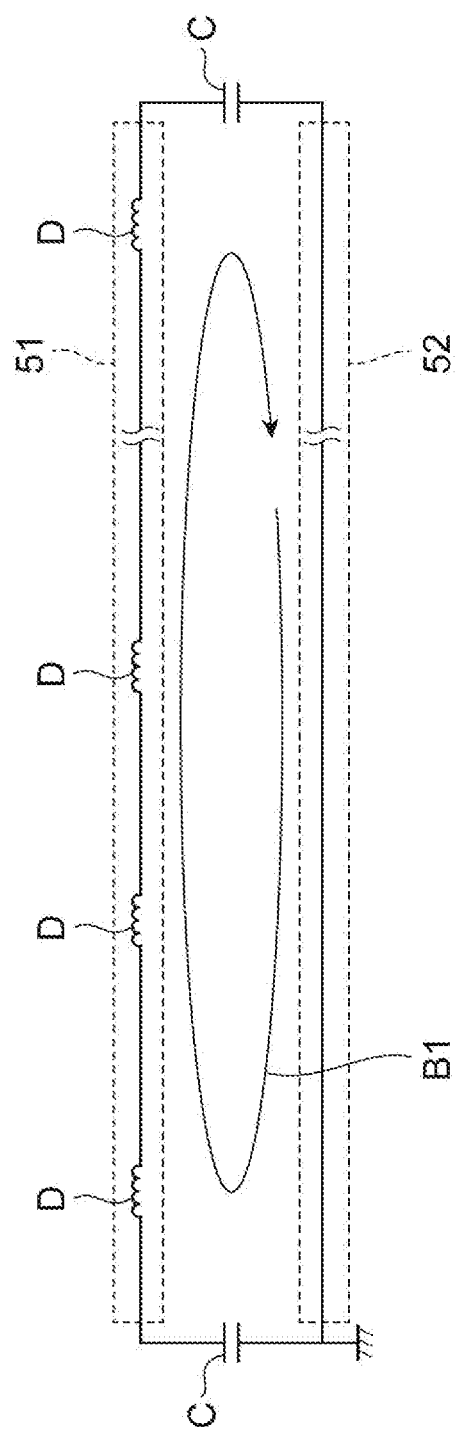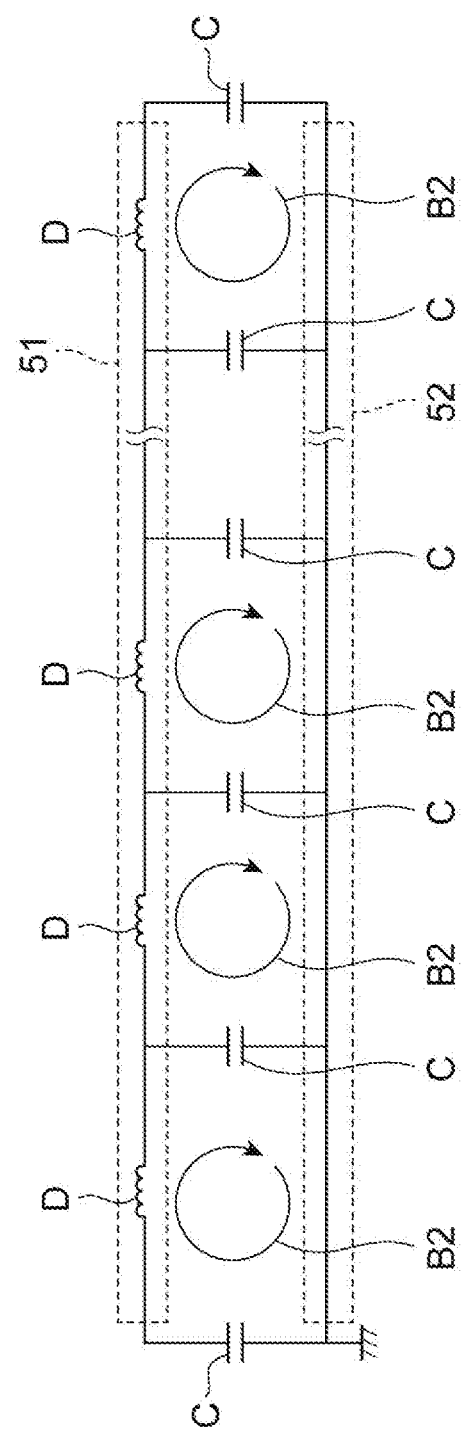

PACKAGE FOR OPTICAL RECEIVER MODULE

CROSS REFERENCE TO RELATED APPLICATION

This application is a continuation of U.S. application Ser. No. 16/256,060 filed on Jan. 24, 2019 and claims the priority benefit of U.S. application Ser. No. 16/256,060 and Japanese Applications, JP2018-011674 filed on Jan. 26, 2018, and JP2018-077539 filed on Apr. 13, 2018, the disclosures of which are hereby incorporated by reference in their entirety.

TECHNICAL FIELD

The present disclosure relates to a package for an optical receiver module.

BACKGROUND

U.S. Pat. No. 6,992,250 discloses a package for enclosing an electronic component. This package includes a base body, a frame body, and an input/output terminal. A mounting portion on which the electronic component is mounted is provided on a bottom surface of the base body. The frame body disposed on the bottom surface of the base body surrounds the mounting portion. A lid body is attached to an upper surface of the frame body. The input/output terminal has a line conductor for electrically connecting an internal portion and an external portion of the frame body. The line conductor is a strip line or a microstrip line. Each of the base body, the frame body, and the lid body is made of a metal material, while the input/output terminal is made of an insulating material.

U.S. Pat. No. 6,036,375 discloses a package for enclosing a semiconductor optical device. This package includes a base body, a frame body, and a lid body, and encloses the semiconductor optical device. An attachment portion on which the semiconductor optical device is mounted is provided on a bottom surface of the base body. The semiconductor optical device is electrically connected to an electric circuit located outside the bottom surface of the base body via an external lead terminal. The frame body attached to the base body surrounds the attachment portion. The frame body has a through hole through which an optical fiber is fixed. The lid body is attached to an upper surface of the frame body. Each of the base body, the frame body, and the lid body is made of a metal material.

SUMMARY

With increase in transmission speeds of optical communication in recent years, miniaturization of optical transceivers is proceeding. For example, an optical transceiver includes an optical transmitter module incorporating a light emitting element such as a laser diode, an optical receiver module incorporating a light receiving element such as a photodiode, and a circuit board electrically connected to these modules. The modules and circuit board are enclosed in one housing. The optical transmitter module and the optical receiver module have a package for an optical transmitter module and a package for an optical receiver module, respectively. These packages are disposed adjacent to each other in a direction crossing an optical axis in front of the circuit board. The package for the optical receiver module includes a conductive housing for enclosing a light receiving element, and a dielectric feed-through extending from the inside to the outside of the housing. The feed-through includes a plurality of wirings for establishing electric continuity between the inside and the outside of the housing. A circuit for driving the light emitting element of the optical transmitter module is disposed outside the optical transmitter module (e.g., on the circuit board described above).

According to the optical transceiver thus configured, electromagnetic noise generated from the wiring between the driving circuit and the optical transmitter module increases as a transmission speed of optical communication increases. This electromagnetic noise causes crosstalk of received signals within the optical receiver module disposed adjacent to the optical transmitter module by electromagnetic interference. In case of the package for the optical receiver module, as described above, the dielectric feed-through penetrates a part of the conductive housing. A plurality of wirings is provided in the feed-through to establish electric continuity between the inside and the outside of the housing. There is arising such a problem that electromagnetic noise easily enters the inside of the housing of the optical receiver module via the wirings.

One aspect of the present disclosure relates to a package for an optical receiver module, the package including a housing that encloses a semiconductor optical device therein, the housing having electrically conductive walls including a rear wall and a pair of side walls each extending from the rear wall, and a feed-through provided in the rear wall of the housing. The feed-through includes an internal portion having an upper rear face and a lower rear face, the internal portion being made of an insulating material, and an external portion made of the insulating material, the external portion protruding from the upper rear face and the lower rear face of the internal portion outwardly and having a top face and/or a back face continuous to the upper rear face and/or the lower rear face of the internal portion, a first top face, a second back face, and a pair of side faces, the rear face and the side faces connecting the first top face with the second back face, the first top face of the external portion including DC lines, the second back face including transmission lines comprising signal lines and ground lines, and the transmission lines carrying high frequency signals for the semiconductor optical device. At least one of the DC lines is provided on the first top face of the external portion, and a ground line is provided by at least one along both side of at least one of the DC lines.

Another aspect of the present disclosure relates to a package for an optical receiver module, the package including a housing that encloses a semiconductor optical device therein, the housing having electrically conductive walls including a rear wall and a pair of side walls each extending from the rear wall, and a feed-through provided in the rear wall of the housing. The feed-through includes an internal portion having an upper rear face and a lower rear face, the internal portion being made of an insulating material, and an external portion made of the insulating material, the external portion protruding from the upper rear face and the lower rear face of the internal portion outwardly and having a top face and/or a back face continuous to the upper rear face and/or the lower rear face of the internal portion, a first top face, a second back face, and a pair of side faces, the rear face and the side faces connecting the first top face with the second back face, the first top face of the external portion including DC lines, the second back face including transmission lines comprising signal lines and ground lines, and the transmission lines carrying high frequency signals for the semiconductor optical device. At least one of the DC lines is provided on the first top face of the external portion. The package further comprises a ground layer provided between the first top face and the second back face inside the feed-through, and a shield layer provided between the first top face and the ground layer inside the feed-through, the shield layer having parasitic capacitance by the ground layer. At least one of the DC lines is electrically connected to the shield layer via a via-hole inside the feed-through.

BRIEF DESCRIPTION OF THE DRAWINGS

The foregoing and other purposes, aspects and advantages will be better understood from the following detailed description of a preferred embodiment of the invention with reference to the drawings, in which:

FIG. 9A is a diagram showing an equivalent circuit in a state that a DC wiring 51 is disposed far from a ground wiring 52, while FIG. 9B shows an equivalent circuit in a state that the DC wiring 51 is disposed near the ground wiring 52;

FIG. 18A is a diagram showing an equivalent circuit constituted by the conductive pad 61, a via-hole 62, and the ground pattern 42, while

DETAILED DESCRIPTION

Description of Embodiment of the Disclosure

Figure 1:
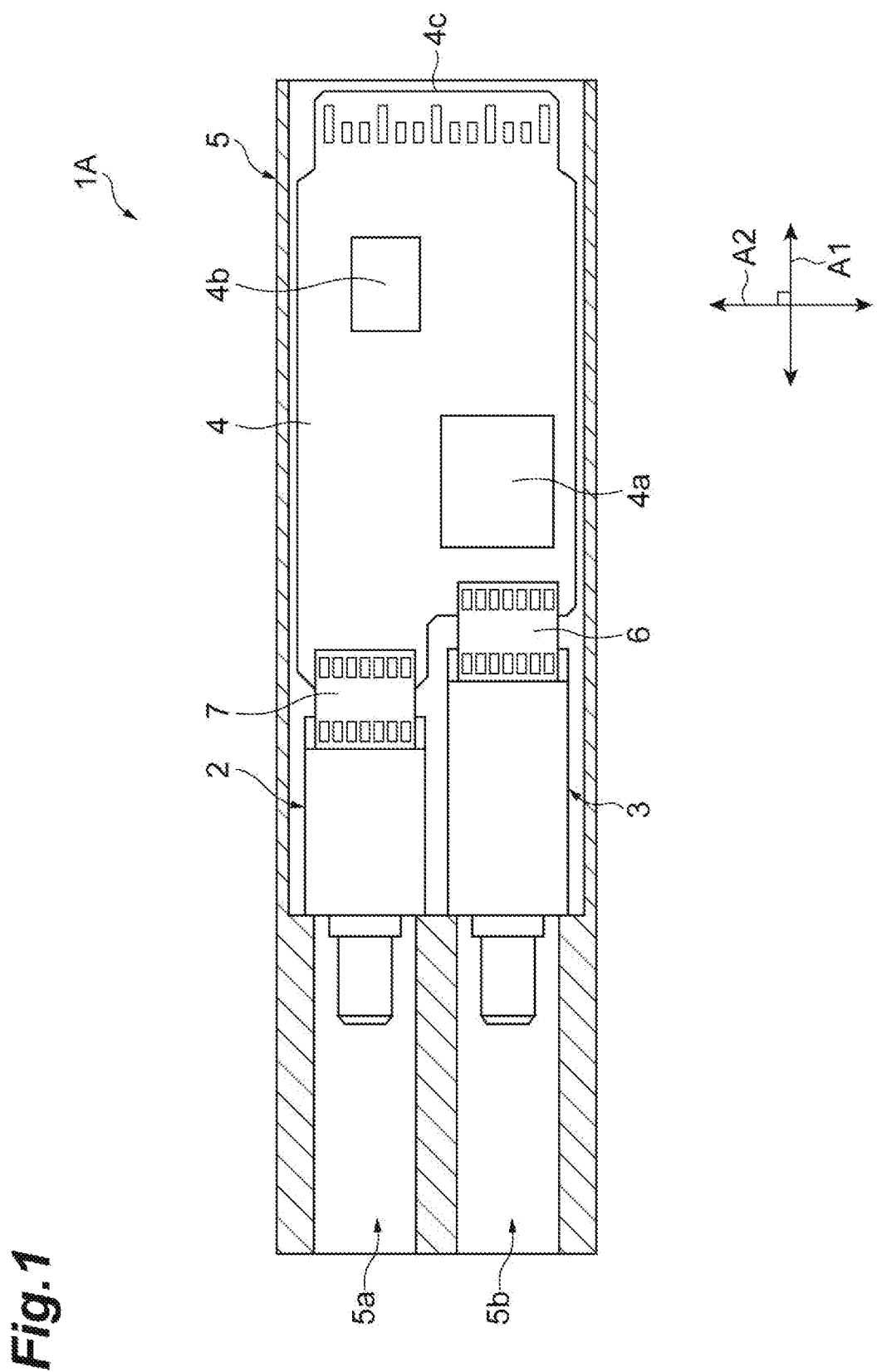
FIG. 1 is a plan view schematically showing a configuration of an optical transceiver 1A usable for optical communication.

Initially, details of embodiments of the present disclosure will be described one by one. A package for an optical receiver module according to one embodiment includes a conductive housing configured to enclose a light receiving element, and a feed-through including a first surface and a second surface each positioned outside the housing and facing each other, the feed-through penetrating a side wall of the housing and including a dielectric material. A plurality of first electric wirings including at least either a monitor wiring or a power supply wiring, and a second electric wiring as a transmission line configured to transmit a radio-frequency signal are provided on a surface included in the feed-through and located inside the housing. A plurality of third electric wirings electrically connected to the plurality of first electric wirings, and arranged along the side wall, and a plurality of electromagnetic shielding wirings connected to a reference potential are provided on the first surface. At least one side of each of the third electric wirings in an arranging direction is adjacent to any one of the electromagnetic shielding wirings. A fourth electric wiring as a transmission line electrically connected to the second electric wiring is provided on the second surface.

According to this package for the optical receiver module, the first electric wirings and the third electric wirings are provided in the feed-through which penetrates the side wall of the housing. The first electric wirings are disposed inside the housing, while the third electric wirings are disposed outside the housing. These electric wirings are electrically connected to each other. Accordingly, unless no device for improvement is provided, electromagnetic noise enters the optical receiver module via the first electric wirings and the third electric wirings. According to the package of the optical receiver module, therefore, the plurality of electromagnetic shielding wirings connected to the reference potential are provided. Any one of the electromagnetic shielding wirings is adjacent to at least one side of each of the third electric wirings. In this case, a large number of small current loops are generated by electromagnetic noise between the third electric wirings and the electromagnetic shielding wirings. The adjoining current loops are reversely directed, and therefore cancel each other. Accordingly, the electromagnetic noise transmitted through the third electric wirings attenuates, and therefore intrusion of the electromagnetic noise into the optical receiver module via the first electric wirings and the third electric wirings of the feed-through can be reduced.

The third electric wirings and the electromagnetic shielding wirings may be alternately disposed in the arranging direction. In this configuration, the electromagnetic shielding wirings are disposed on both sides of each of the third electric wirings. Accordingly, the electromagnetic noise transmitted through the third electric wirings attenuates more effectively, and therefore intrusion of the electromagnetic noise into the optical receiver module can be further reduced.

The two third electrical wirings may be disposed between the electromagnetic shielding wirings. In this configuration, one side of each of the third electric wirings is always disposed on the corresponding electromagnetic shielding wiring. Accordingly, attenuation of the electromagnetic noise transmitted through the third electric wirings is achievable while reducing the number of electromagnetic shielding wirings and securing a wide space of the first surface for the third electric wirings.

The feed-through may further include a ground pattern embedded between the first surface and the second surface. The plurality of electromagnetic shielding wirings and the ground pattern may be connected to each other via via-holes. According to this configuration, a large number of small current loops are generated by electromagnetic noise also between the ground pattern and the third electric wirings. Accordingly, the electromagnetic noise transmitted through the third electric wirings attenuates more effectively, and therefore intrusion of the electromagnetic noise into the optical receiver module can be further reduced. In this case, the feed-through may have a terminal surface configured to connect the first surface and the second surface and extending along the side wall. The ground pattern may include a portion extending along the terminal surface, overlapping the plurality of electromagnetic shielding wirings as viewed in a normal line direction of the first surface, and connected to the plurality of electromagnetic shielding wirings via a plurality of via-holes.

A package for an optical receiver module according to another embodiment includes: a conductive housing configured to enclose a light receiving element; a feed-through including a first surface and a second surface each positioned outside the housing and facing each other, the feed-through penetrating a side wall of the housing and including a dielectric material; a plurality of first electric wirings provided on a surface included in the feed-through and located inside the housing, and including at least either a monitor wiring or a power supply wiring; a second electric wiring as a transmission line provided on a surface included in the feed-through and located inside the housing, and transmitting a radio-frequency signal; a plurality of third electric wirings provided on the first surface, electrically connected to the plurality of first electric wirings, and disposed along the side wall; a ground pattern provided between the first surface and the second surface inside the feed-through; and at least one first conductive pad provided on a third surface formed between the first surface and the ground pattern and parallel to the first surface. The first conductive pad faces the ground pattern, and is electrically connected to the corresponding third electric wiring via a via-hole.

According to this package for the optical receiver module, the first electric wirings and the third electric wirings are provided in the feed-through which penetrates the side wall of the housing. The first electric wirings are disposed inside the housing, while the third electric wirings are disposed outside the housing. These electric wirings are electrically connected to each other. Accordingly, unless no device for improvement is provided, electromagnetic noise enters the optical receiver module via the first electric wirings and the third electric wirings. In this case, crosstalk between the electromagnetic noise and a radio-frequency signal transmitted through the second electric wiring is caused. According to the package for the optical receiver module described above, therefore, at least the one first conductive pad is provided on the third surface parallel to the first surface and provided between the first surface and the ground pattern embedded between the first surface and the second surface. Each of the first conductive pads faces the ground pattern, and is electrically connected to the corresponding one of the third electric wirings via the via-hole. In this case, a resonance circuit is constituted by a capacitance generated between the first conductive pad and the ground pattern, and inductance of the third electric wiring and the via-hole. High frequency electromagnetic noise does not easily pass at a frequency around the resonance frequency of the resonance circuit. Accordingly, the high frequency electromagnetic noise transmitted through the third electric wirings attenuates, and therefore intrusion of the electromagnetic noise into the optical receiver module via the first electric wirings and the third electric wirings of the feed-through can be reduced.

A fourth electric wiring as a transmission line electrically connected to the second electric wiring and transmitting a radio-frequency signal may be provided on the second surface. In this case, the ground pattern described above and the fourth electric wirings are capable of constituting a microstrip line.

A plurality of the first conductive pads may be disposed side by side along the side wall. In this configuration, the electromagnetic noise reduction effect described above is achievable for the plurality of third electric wirings. In addition, the first conductive pads can be efficiently disposed inside the small-sized feed-through.

A width of the first conductive pad in a direction along the side wall may be larger than a width of each of the third electrical wirings in the same direction. In this configuration, a sufficient capacitance can be secured between the first conductive pad and the ground pattern. Accordingly, even when the frequency of electromagnetic noise generated from a noise source (e.g., wiring between optical transmitter module and driving circuit) is a relatively small frequency, the resonance frequency of the resonance circuit becomes sufficiently close to this frequency.

A plurality of the first conductive pads may be arranged in two or more rows each extending along the side wall. This configuration can efficiently positions the first conductive pads in the small-sized feed-through while securing a width sufficient for each of the first conductive pads. In this configuration, one of the adjoining third electrical wires in the package for the optical receiver module may be connected to the first conductive pad different from the first conductive pad to which the other of the adjoining third electric wirings is connected. In this case, the first conductive pad to which the one third electric wire is connected may be disposed in one of two or more rows, while the first conductive pad to which the other third electric wire is connected may be disposed in another one of the two or more rows.

A second conductive pad having an area different from an area of the first conductive pad may be further connected via a via-hole to the third electrical wiring connected to the first conductive pad. The second conductive pad may be embedded between the first surface and the ground pattern, and face the ground pattern. In this case, the resonance frequency of the resonance circuit constituted by the first conductive pad and the via-hole of the first conductive pad, and the resonance frequency of the resonance circuit constituted by the second conductive pad and the via-hole of the second conductive pad are made different from each other. Accordingly, even when electromagnetic noise contains two frequencies, effective attenuation of electromagnetic noise is achievable for each frequency.

Detailed Description of Embodiment of the Disclosure

Next, embodiment according to the present disclosure will be described as referring to accompanying drawings. The present disclosure, however, is not restricted to the embodiment and has a scope defined in claims attached hereto and all changes and/or modifications with the scope and equivalent there to. In the description of the drawings, numerals or symbols same with or similar to each other will refer to elements same with or similar to each other without overlapping explanations.

First Embodiment

FIG. 1 is a plan view schematically showing a configuration of an optical transceiver 1A usable for optical communication. The optical transceiver 1A includes an optical receiver module 2 containing a package for an optical receiver module according to a first embodiment, an optical transmitter module 3, a circuit board 4, and a housing 5. The housing 5 is a hollow rectangular parallelepiped container which extends in a direction A1 corresponding to an optical axis direction, and encloses the optical receiver module 2, the optical transmitter module 3, and the circuit board 4 inside the housing 5. A receiving port 5a and a transmitting port 5b are provided at one end of the housing 5 in the direction A1. An optical connector attached to a distal end of a receiving optical fiber is fitted to and pulled from the receiving port 5a. An optical connector attached to a distal end of a transmitting optical fiber is fitted to and pulled from the transmitting port 5b. The other end of the housing 5 in the direction A1 is open, and a connecting terminal 4c of the circuit board 4 is exposed through the opening.

The optical receiver module 2 is a receiver optical sub-assembly (ROSA) incorporating a light receiving element such as a photodiode, and converts an optical signal input via the receiving optical fiber into an electric reception signal. The optical transmitter module 3 is a transceiver optical sub-assembly (TOSA) incorporating a light emitting element such as a laser diode. The optical transmitter module 3 converts an electric transmission signal into an optical signal, and supplies the optical signal to the transmitting optical fiber. The optical receiver module 2 and the optical transmitter module 3 are provided close to each other in a direction A2 crossing the direction A1 (crossing at right angles in one example) inside the housing 5.

The circuit board 4 includes at least a driving circuit 4a for driving the optical transmitter module 3, and a signal processing circuit 4b for processing the received signal output from the optical receiver module 2. The circuit board 4 is electrically connected to the optical transmitter module 3 via a flexible printed wiring board 6, and is electrically connected to the optical receiver module 2 via a flexible printed wiring board 7. The transmission signal output from the driving circuit 4a is sent to the optical transmitter module 3 via the flexible printed wiring board 6. The reception signal output from the optical receiver module 2 is sent to the signal processing circuit 4b via the flexible printed wiring board 7.

Figure 2:
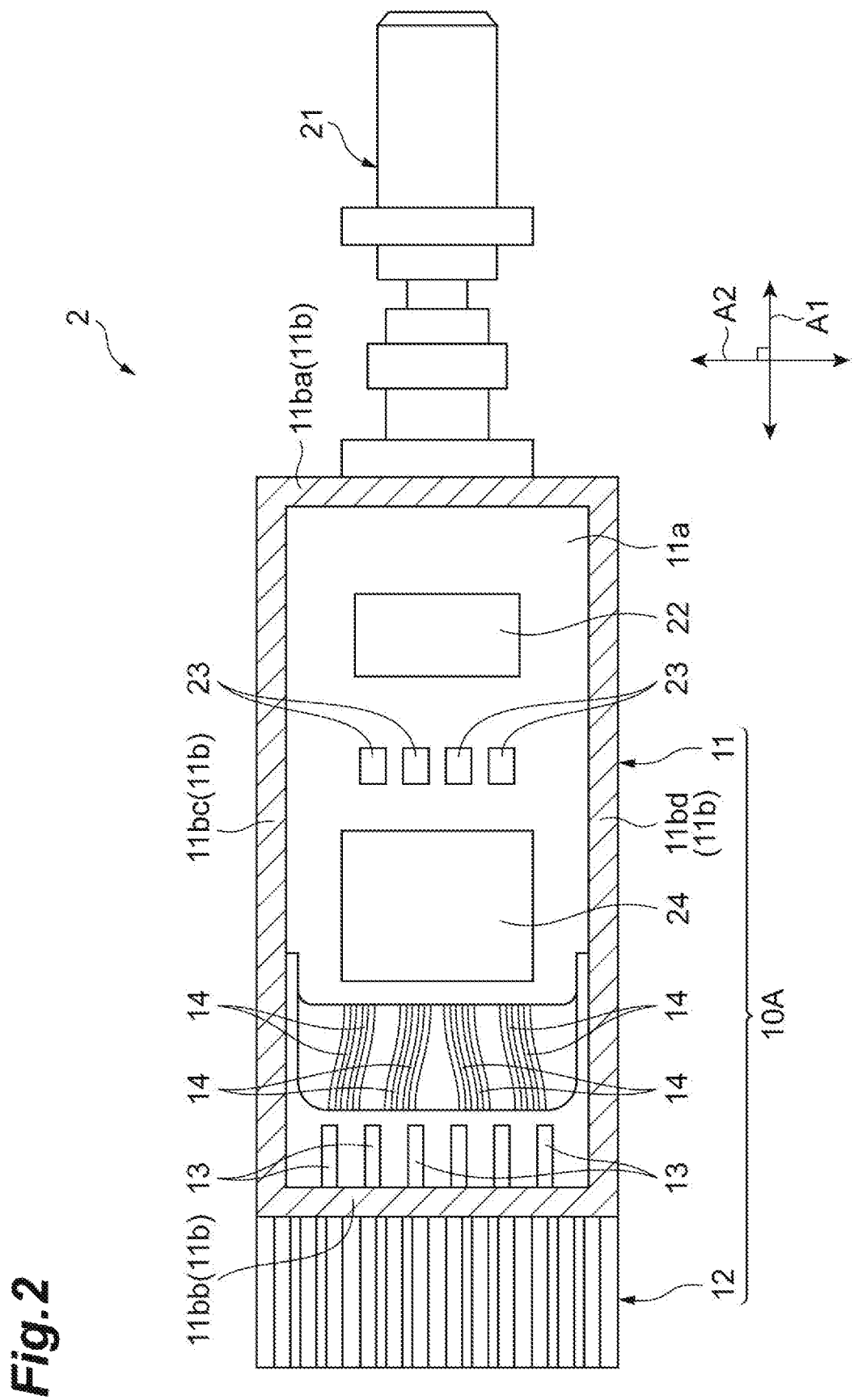
FIG. 2 is a plan view schematically showing a configuration of an optical receiver module 2.

FIG. 2 is a plan view schematically showing a configuration of the optical receiver module 2. As shown in FIG. 2, the optical receiver module 2 includes a package for an optical receiver module (hereinafter, simply referred to as package) 10A, an optical receptacle 21, an optical demultiplexer 22, and N photodiodes 23 (N: integer of 1 or larger, N=4 in the example of the figure), and a transimpedance amplifier (TIA) 24.

The package 10A is a hollow rectangular parallelepiped container which extends in the direction A1, and includes a housing 11 and a feed-through 12. The housing 11 is constituted by a conductor such as metal, for example. The housing 11 includes a rectangular bottom plate 11a, and a rectangular frame-shaped side wall 11b surrounding a plate surface of the bottom plate 11a. The side wall 11b includes a pair of terminal walls 11ba and 11bb facing each other in the direction A1, and a pair of side walls 11bc and 11bd facing each other in the direction A2. An opening of the side wall 11b on the side opposite to the bottom plate 11a is closed by a cover plate 11c (see FIG. 3). The feed-through 12 penetrates the terminal wall 11bb, and establishes electric continuity between an internal portion and an external portion of the housing 11. One end of the flexible printed wiring board 7 shown in FIG. 1 conductively contacts a portion included in the feed-through 12 and located outside the housing 11.

The optical receptacle 21 has a cylindrical shape whose center is located on the optical axis extending in the direction A1. One end of the optical receptacle 21 is fixed to the terminal wall 11ba of the package 10A. The optical receptacle 21 incorporates a cylindrical sleeve. The sleeve is fitted to a columnar ferrule attached to the distal end of the receiving optical fiber. The optical receptacle 21 further incorporates a lens. The lens collimates (parallelizes) an optical signal output from the optical fiber. The collimated optical signal is introduced into the package 10A through an opening formed in the terminal wall 11ba.

The optical demultiplexer 22 is an optical component that demultiplexes a wavelength-multiplexed optical signal into a plurality of wavelength components. The optical demultiplexer 22 is enclosed inside the housing 11 and optically coupled to the optical receptacle 21, and receives the optical signal output from the optical receptacle 21. The optical demultiplexer 22 demultiplexes the optical signal into a plurality of wavelength components, and supplies these wavelength components to the corresponding photodiodes 23.

The N photodiodes 23 are enclosed inside the housing 11, and optically coupled to the optical demultiplexer 22. For example, the N photodiodes 23 are mounted on the bottom plate 11a, and disposed side by side in the direction A2. Each of the photodiode 23 receives a corresponding wavelength component from the optical demultiplexer 22, and generates an electric signal corresponding to light intensity of the wavelength component to convert the optical signal into a current signal. Each of the photodiode 23 is electrically connected to the TIA 24, and supplies the generated current signal to the TIA 24. The TIA 24 converts the current signal received from each of the photodiodes 23 into a reception signal which is a voltage signal. Each of the reception signals generated in the TIA 24 is output to the outside of the optical receiver module 2 via the feed-through 12. Specifically, each of the reception signals is sent to the signal processing circuit 4b on the circuit board 4 via the flexible printed wiring board 7 shown in FIG. 1.

Figure 3:
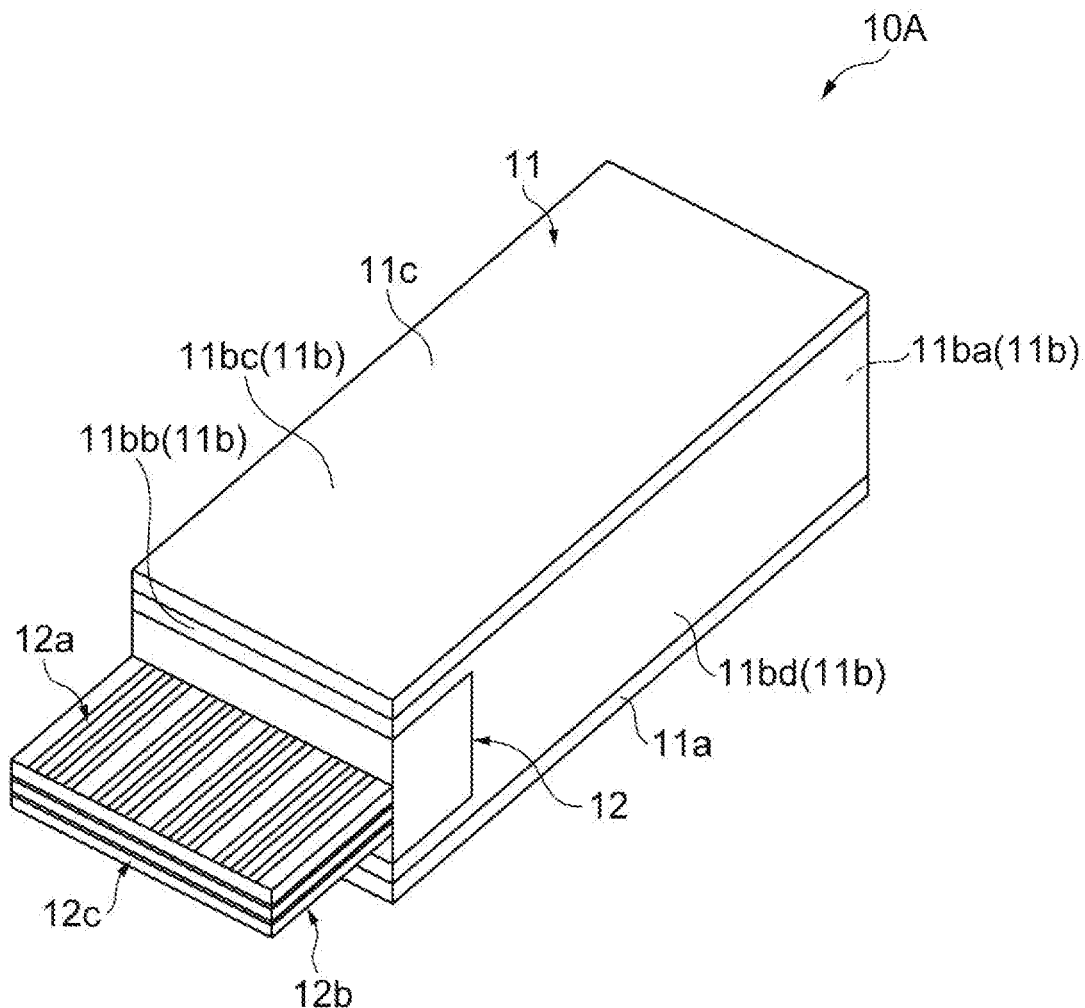
FIG. 3 is a perspective view showing an external appearance of a package 10A.
Figure 4:
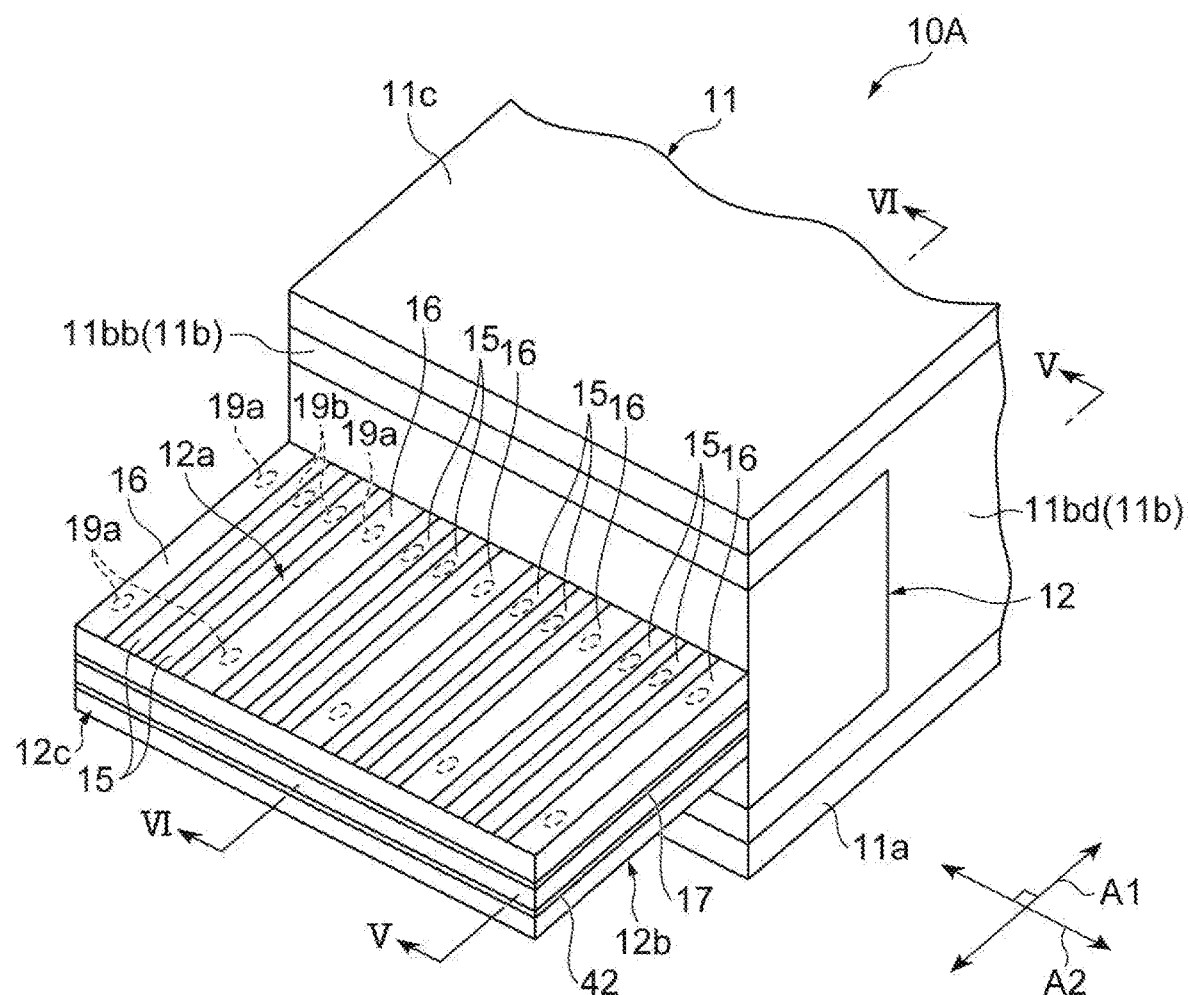
FIG. 4 is an enlarged perspective view of a part of FIG. 3.

FIG. 3 is a perspective view showing an external appearance of the package 10A. FIG. 4 is an enlarged perspective view of a part of FIG. 3. As described above, the package 10A of the first embodiment includes the housing 11 and the feed-through 12. The housing 11 is a conductive container, and includes the bottom plate 11a, the side wall 11b, and the cover plate 11c. The side wall 11b includes a pair of the terminal walls 11ba and 11bb, and a pair of the side walls 11bc and 11bd. The terminal walls 11ba and 11bb face each other in the direction A1, and extend along a plane crossing the direction A1 (i.e., in direction A2). The terminal wall 11ba is positioned at one end of the housing 11 in the direction A1, while the terminal wall 11bb is positioned at the other end of the housing 11 in the direction A1. The pair of side walls 11bc and 11bd face each other in the direction A2, and extend along a plane crossing the direction A2 (i.e., in direction A1).

The feed-through 12 contains a dielectric material such as ceramic, and penetrates the terminal wall 11bb. Accordingly, the feed-through 12 includes a portion positioned inside the housing 11, and a portion positioned outside the housing 11. As shown in FIG. 2, a plurality of DC wirings (first electric wirings) 13, and N radio-frequency signal wirings (second electric wirings) 14 are provided on a surface of a part included in the feed-through 12 and located inside the housing 11. The plurality of DC wirings 13 include at least either a monitor wiring or a power supply wiring. The monitor wiring is a wiring for transmitting a signal from a temperature sensor or a light intensity monitor. The power supply wiring is a wiring for supplying power to the photodiode 23 and the TIA 24. The N radio-frequency signal wirings 14 are coplanar type transmission lines for transmitting reception signals as radio-frequency signals. One end of each of the radio-frequency signal wirings 14 is electrically connected to the TIA 24 via a not-shown bonding wire. While the respective radio-frequency signal wirings 14 each including a pair of differential signal wirings are shown in the figure by way of example, the radio-frequency signal wirings 14 may each include a single signal wiring.

As shown in FIG. 4, a portion included in the feed-through 12 and located outside the housing 11 protrudes from the terminal wall 11bb in the direction A1. This portion of the feed-through 12 has a first surface 12a and a second surface 12b facing each other in a direction crossing both the directions A1 and A2. The first surface 12a and the second surface 12b are both flat and parallel to each other. The first surface 12a and the second surface 12b extend in the directions A1 and A2. The feed-through 12 further has a terminal surface 12c which connects the first surface 12a and the second surface 12b and extends along the terminal wall 11bb (i.e., in direction A2).

A plurality of DC pads (third electric wirings) 15 and a plurality of ground pads (electromagnetic shielding wirings) 16 are provided on the first surface 12a. Each of the plurality of DC pads 15 and the plurality of ground pads 16 is a metal film adhered onto the feed-through 12 which is a dielectric. Each of the plurality of DC pads 15 is electrically connected to the corresponding one of the plurality of corresponding DC wirings 13 via a wiring embedded inside the feed-through 12. The plurality of DC pads 15 each have an elongated shape extending in the direction A1, and are disposed side by side along the terminal wall 11bb (i.e., in direction A2). The plurality of ground pads 16 are connected to a reference potential via a ground terminal of the flexible printed wiring board 7. In the first embodiment, a plurality of DC pad groups each constituted by the two DC pads 15, and a plurality of the ground pads 16 are alternately disposed in the direction A2.

At least one side of each of the DC pads 15 in the direction A2 is located adjacent to any one of the ground pads 16. In the first embodiment, the two DC pads 15 are disposed between a pair of the ground pads 16 different from each other. Accordingly, one side of each of the DC pads 15 is always disposed adjacent to any one of the ground pads 16. The state that the DC pad 15 and the ground pad 16 are adjacent to each other refers to a state that no other wiring is interposed between the DC pad 15 and the ground pad 16. In one example, each of the lengths of the DC pad 15 and the ground pad 16 in the direction A1 falls within a range from 0.8 mm to 1.4 mm, and a clearance between the adjoining DC pad 15 and the ground pad 16 (width of clearance between DC pad 15 and ground pad 16) is 0.3 mm or shorter.

Figure 5:
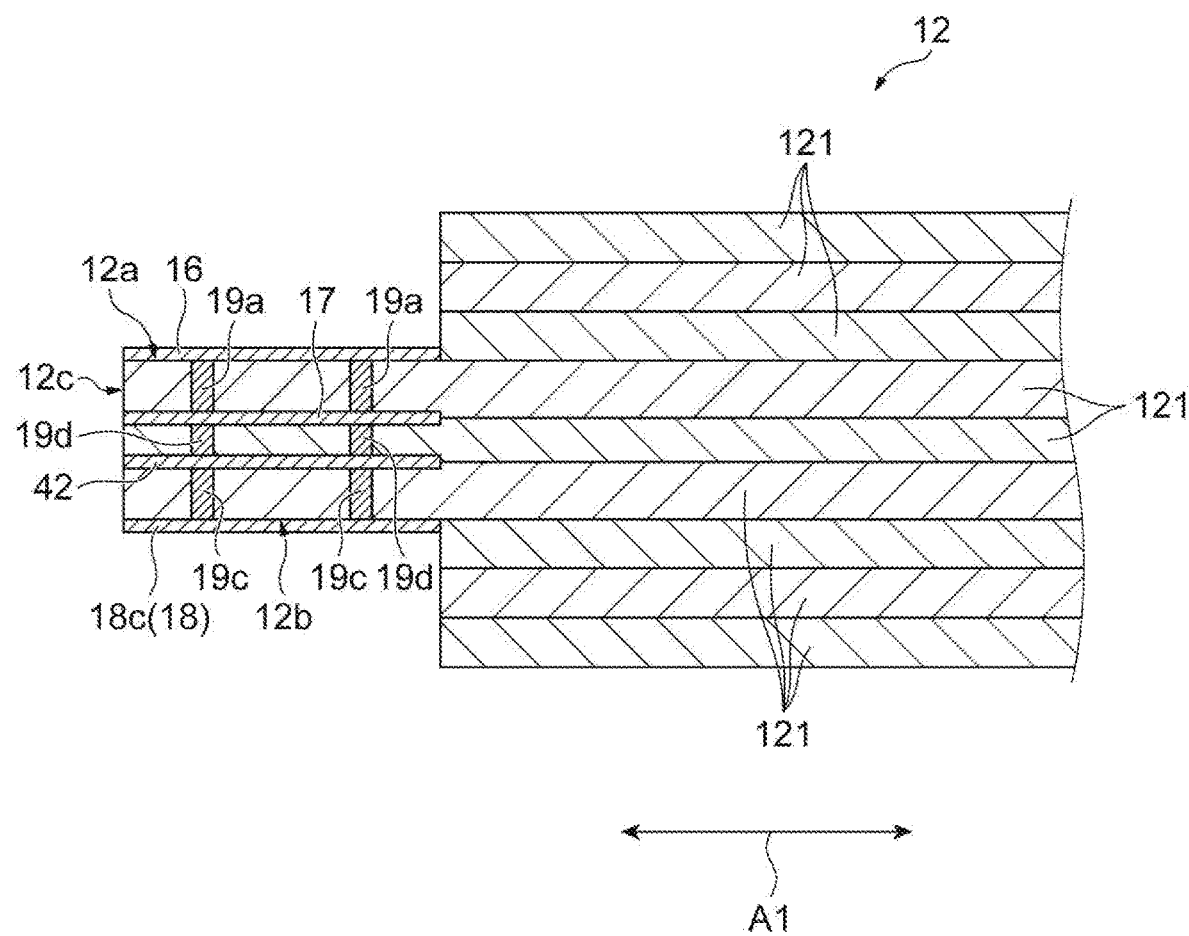
FIG. 5 is a cross-sectional view of a feed-through 12 taken along a line V-V in FIG. 4, showing a cross section including a ground pad 16.
Figure 6:
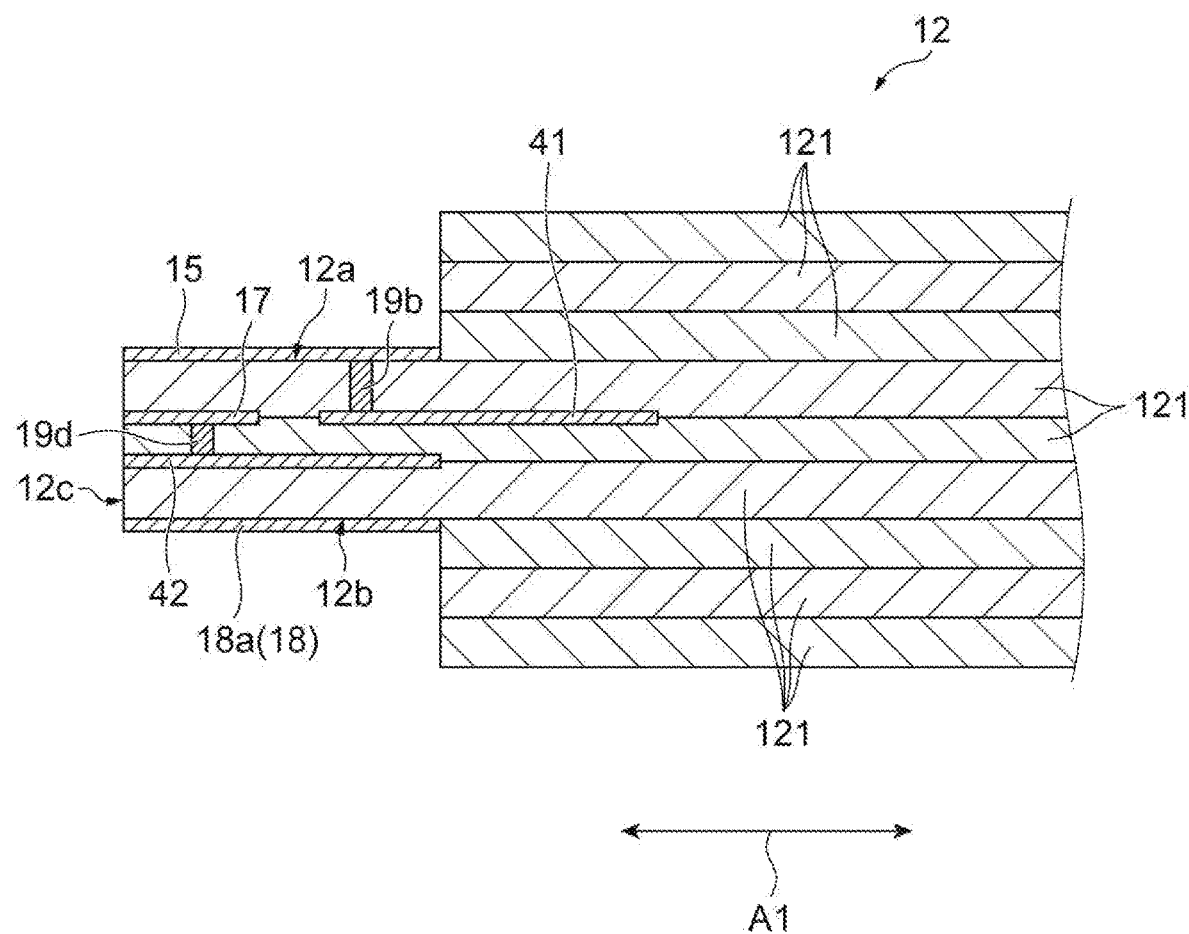
FIG. 6 is a cross-sectional view of the feed-through 12 taken along a line VI-VI in FIG. 4, showing a cross section including DC pads 15.

FIG. 5 is a cross-sectional view of the feed-through 12 taken along a line V-V in FIG. 4, showing a cross section including the ground pad 16. FIG. 6 is a cross-sectional view of the feed-through 12 taken along a line VI-VI in FIG. 4, showing a cross section including the DC pad 15. As shown in FIGS. 5 and 6, the feed-through 12 is constituted by a plurality of laminated dielectric layers 121. The feed-through 12 further includes a ground pattern 17. The ground pattern 17 is embedded between the dielectric layers 121 positioned between the first surface 12a and the second surface 12b. The ground pattern 17 is a conductive layer extending along the first surface 12a, and is constituted by a metal layer, for example. At least the one dielectric layer 121 is interposed between the ground pattern 17 and the first surface 12a.

As shown in FIG. 5, the respective ground pads 16 and the ground pattern 17 are connected to each other via via-holes 19a penetrating the dielectric layers 121. While FIG. 5 shows an example which connects the one ground pad 16 and the ground pattern 17 via the two via-holes 19a, the number of the via-holes 19a may be one or any number more than one. In this manner, the ground pattern 17 is set to the reference potential.

Figure 7:
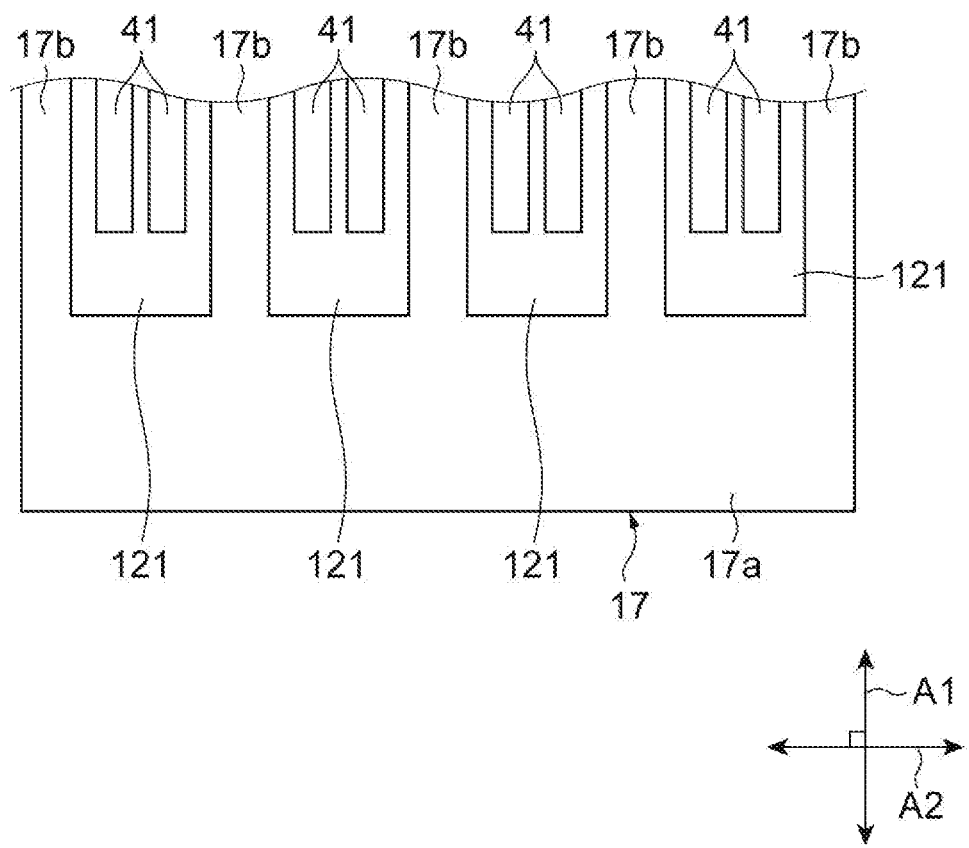
FIG. 7 is a diagram showing a planar shape of a ground pattern 17.

FIG. 7 is a diagram showing a planar shape of the ground pattern 17. As shown in FIG. 7, the ground pattern 17 of the first embodiment includes a portion 17a and a plurality of portions 17b. The portion 17a extends along the terminal surface 12c (i.e., in direction A2), and overlaps the plurality of ground pads 16 as viewed in the normal direction of the first surface 12a. In one example, the portion 17a is exposed from the terminal surface 12c. The portion 17a is connected to each of the plurality of ground pads 16 via the plurality of corresponding via-holes 19a. The plurality of portions 17b protrudes from the portion 17a toward the inside of the housing 11. Each of the plurality of portions 17b is provided for the corresponding one of the plurality of ground pads 16, and overlaps the corresponding ground pad 16 as viewed in the normal direction of the first surface 12a. The respective portions 17b are connected to the corresponding ground pads 16 via the via-holes 19a.

As shown in FIG. 6, each of the DC pads 15 is connected to a wiring 41 embedded between the dielectric layers 121 via the via-hole 19b penetrating the dielectric layer 121. Each of the wirings 41 is a conductive layer extending along the first surface 12a, and is constituted by a metal layer, for example. Each of the wirings 41 is connected to the corresponding DC wiring 13 shown in FIG. 2. As shown in FIG. 7, each of the wirings 41 is disposed with a clearance left from the ground pattern 17. The dielectric layer 121 is disposed between each of the wirings 41 and the ground pattern 17.

Figure 8:
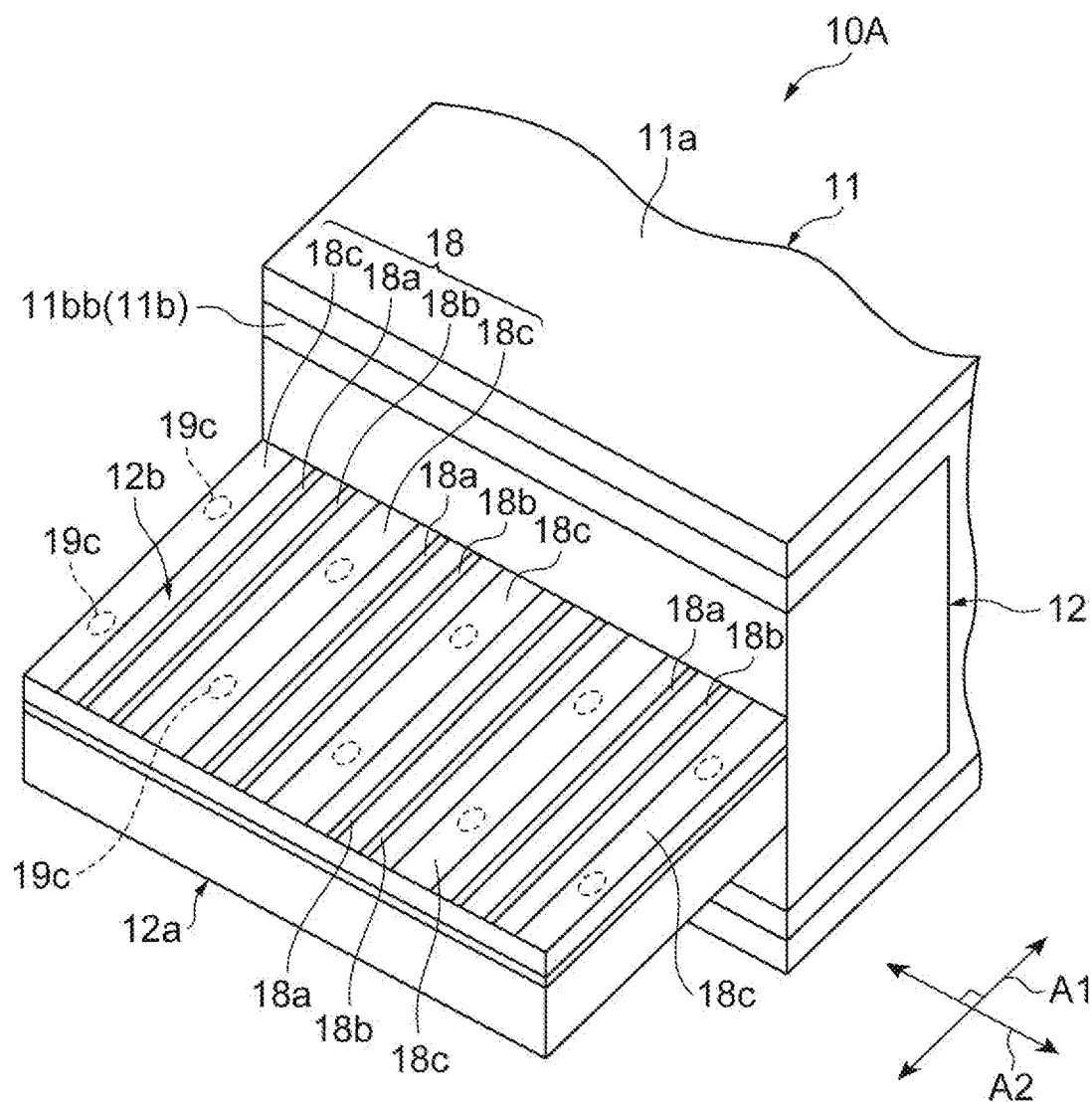
FIG. 8 is an enlarged perspective view showing a part of the external appearance of the package 10A, depicting the feed-through 12 as viewed from a second surface 12b.

FIG. 8 is an enlarged perspective view showing a part of the external appearance of the package 10A, depicting the feed-through 12 as viewed from the second surface 12b. As shown in FIG. 8, N radio-frequency signal pads 18 (fourth electric wirings), which are transmission lines, are provided on the second surface 12b of the feed-through 12. Each of the radio-frequency signal pads 18 includes a pair of signal pads 18a and 18b disposed side by side, and ground pads 18c disposed on both sides of the pair of signal pads 18a and 18b. Each of the ground pads 18c is shared by the adjoining radio-frequency signal pads 18. Each of the signal pads 18a and 18b and the ground pads 18c is a metal film adhered onto the feed-through 12 which is a dielectric. The ground pads 18c are set to the reference potential. The signal pads 18a and 18b and the ground pad 18c constitute a coplanar line. Each of the N radio-frequency signal pads 18 is electrically connected to the corresponding one of the N radio-frequency signal wirings 14 (see FIG. 2) via a wiring embedded inside the feed-through 12. A different flexible printed board overlapped with the flexible printed wiring board 7 conductively contacts the second surface 12b. The N radio-frequency signal pads 18 are each connected to the circuit board 4 via the different flexible printed board. While each of the radio-frequency signal pads 18 including a pair of the differential signal pads 18a and 18b is shown in the figure by way of example, each of the radio-frequency signal pads 18 may include a single signal pad.

As shown in FIGS. 5 and 6, the feed-through 12 further includes a ground pattern 42. The ground pattern 42 is embedded between the dielectric layers 121 positioned between the ground pattern 17 and the second surface 12b. The ground pattern 42 is a conductive layer extending along the second surface 12b, and is constituted by a metal layer, for example. At least the one dielectric layer 121 is interposed between the ground pattern 42 and the second surface 12b. The respective ground pads 18c and the ground pattern 42 are connected to each other via a plurality of via-holes 19c penetrating the dielectric layer 121. In this manner, the ground pattern 42 is set to the reference potential. At least the one dielectric layer 121 is interposed between the ground pattern 42 and the ground pattern 17. The ground pattern 42 and the ground pattern 17 are connected to each other via a plurality of via-holes 19d penetrating the dielectric layer 121. The ground pattern 42, which is a wiring for impedance control of the radio-frequency signal pad 18, may be eliminated.

Effects produced by the package 10A of the first embodiment described above will be explained in conjunction with conventional problems. A circuit for driving a light emitting element incorporated in an optical transmitter module of some types of optical transceivers recently available is provided outside the optical transmitter module. In this case, electromagnetic noise is generated from a wiring which connects the driving circuit and the optical transmitter module. Particularly, when an EA modulator integrated semiconductor laser (Electroabsorption Modulator Integrated Laser Diode (EML)) is adopted as the light emitting element incorporated in the optical transmitter module, a higher driving voltage (e.g., amplitude: 2 V) is required, and large electromagnetic noise is generated. Moreover, transmission speeds of recent optical communication are increasing, reaching 50 GBaud or 100 GBaud, for example. As the transmission speed of optical communication increases, electromagnetic noise generated from the wiring between the driving circuit and the optical transmitter module further increases.

On the other hand, with an increase in communication data volumes in recent years, miniaturization of optical transceivers is proceeding, and therefore the optical transmitter module and optical receiver module are often disposed close to each other. The foregoing electromagnetic noise causes crosstalk of received signals within the optical receiver module disposed adjacent to the optical transmitter module by electromagnetic interference. A package of an optical receiver module includes a dielectric feed-through penetrating a part of a conductive housing. A plurality of DC wirings is provided in the feed-through to establish electric continuity between the inside and the outside of the housing. Electromagnetic noise in the conventional optical receiver module excites a current in the DC wirings. This current may enter an inside of the package via the DC wirings, and generate electromagnetic noise inside the package.

For solving this problem, the package 10A of the first embodiment includes a plurality of the ground pads 16 connected to the reference potential. At least one side of each of the DC pads 15 is adjacent to any one of the ground pads 16. FIGS. 9A and 9B are diagrams explaining the foregoing effect produced by the ground pad 16. FIG. 9A is a diagram showing an equivalent circuit in a state that the DC wiring 51 is disposed far from the ground wiring 52. FIG. 9B is a diagram showing an equivalent circuit in a state that the DC wiring 51 is disposed near the ground wiring 52. In the figure, D is an inductance of the DC wiring 51, while C is a parasitic capacitance between the DC wiring 51 and the ground wiring 52. When the DC wiring 51 is far from the ground wiring 52 as shown in FIG. 9A, a current excited in the DC wiring 51 forms a large current loop B1. However, when the DC wiring 51 is near the ground wiring 52 as shown in FIG. 9B, a current excited in the DC wiring 51 forms a large number of small current loops B2. In this case, the adjoining current loops B2, which are reversely directed loops, cancel each other.

According to the package 10A of the first embodiment, a large number of small current loops are similarly generated by electromagnetic noise between the DC pad 15 and the ground pad 16. In this case, the adjoining current loops cancel each other. The current excited in the DC pad 15 attenuates, and therefore the electromagnetic noise generated inside the package 10A decreases by attenuation of the current. The package 10A of the first embodiment therefore reduces intrusion of electromagnetic noise into the optical receiver module 2 via the DC pads 15 and the DC wirings 13 of the feed-through 12. Accordingly, degradation of reception performance of the optical receiver module 2 is avoidable.

The two DC pads 15 may be disposed between the adjoining ground pads 16. Even in this case, one side of each of the DC pads 15 is always disposed on the corresponding ground pad 16. Accordingly, reduction of electromagnetic noise entering the inside of the package 10A is achievable while reducing the number of the ground pads 16 and securing a wide space of the first surface 12a for the DC pads 15.

The feed-through 12 may further include the ground pattern 17 embedded between the first surface 12a and the second surface 12b and connect the plurality of ground pads 16 and the ground pattern 17 via the via-holes 19a. This configuration generates a large number of small current loops also between the ground pattern 17 and the DC pads 15 by electromagnetic noise, thereby more effectively attenuating the currents excited in the DC pads 15. Accordingly, intrusion of electromagnetic noise into the package 10A further decreases. In this case, similarly to the first embodiment, the ground pattern 17 may include the portion 17a extending along the terminal surface 12c and overlapping the plurality of ground pads 16 as viewed in the normal direction of the first surface 12a (see FIG. 7), and connect the portion 17a to the plurality of ground pads 16 via the plurality of via-holes 19a. This configuration prevents intrusion of electromagnetic noise having a quarter wavelength longer than each distance between the via-holes 19a into the package 10A from the terminal surface 12c.

(Modification)

Figure 10:
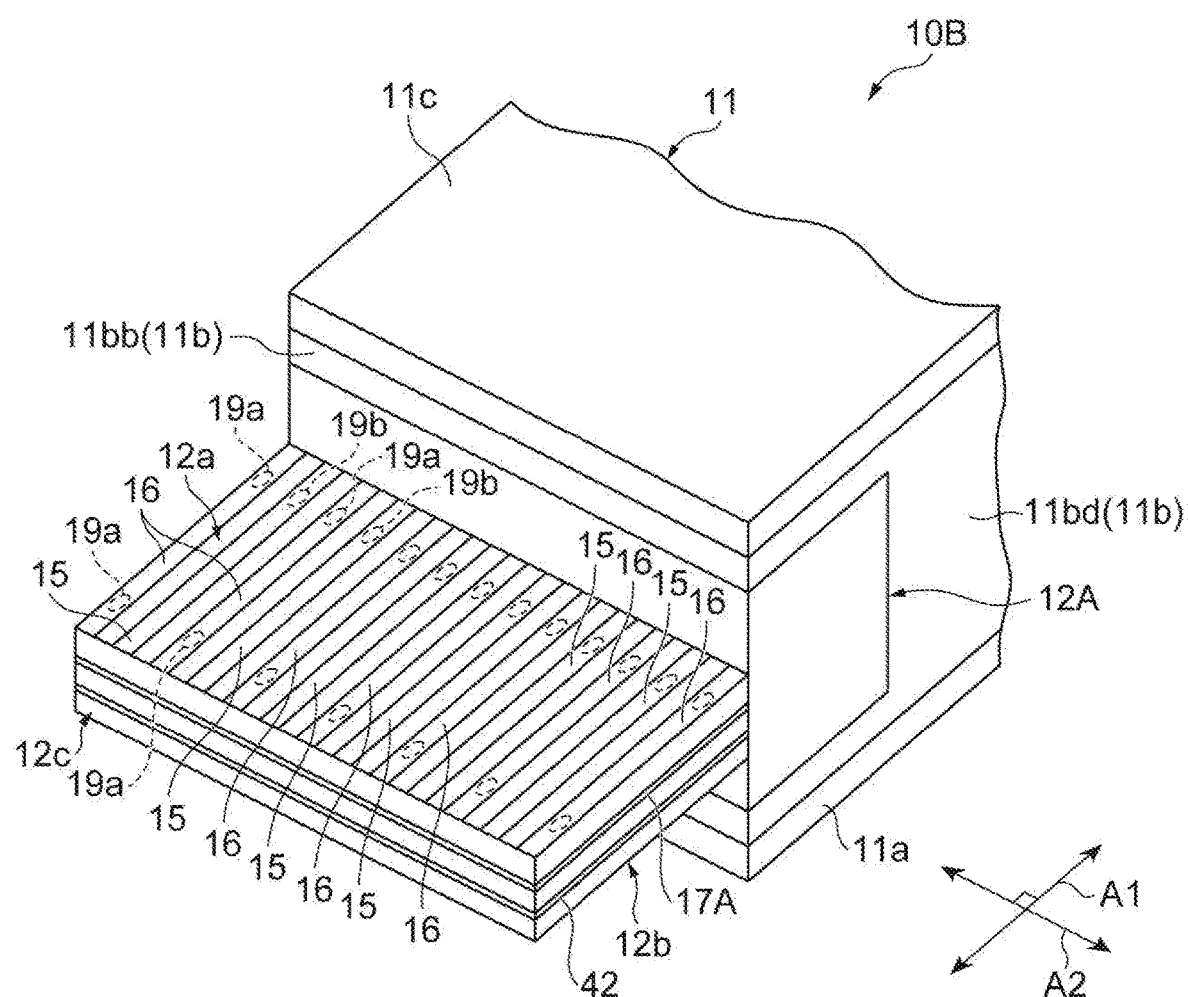
FIG. 10 is an enlarged perspective view showing a part of a package 10B according to a modification of the embodiment.

FIG. 10 is an enlarged perspective view showing a part of a package 10B according to a modification of the first embodiment. FIG. 10 shows the first surface 12a of a feed-through 12A according to the present modification. A configuration on the second surface 12b, and a configuration of the feed-through 12A inside the housing 11 are similar to the corresponding configurations of the feed-through 12 of the first embodiment, and therefore description of these configurations is not repeated.

According to the present modification shown in FIG. 10, the plurality of DC pads 15 and the plurality of ground pads 16 are alternately disposed in the direction A2. In this case, the ground pads 16 are disposed on both sides of each of the DC pads 15. Accordingly, more effective attenuation of currents excited in the DC pads 15 is achievable, and therefore intrusion of electromagnetic noise into the package 10A further decreases. In one example, each of the lengths of the DC pad 15 and the ground pad 16 in the direction A1 falls within a range from 0.8 mm to 1.4 mm, and a clearance between the adjoining DC pad 15 and the ground pad 16 (width of clearance between DC pad 15 and ground pad 16) is 0.3 mm or shorter.

The feed-through 12A has a ground pattern 17A instead of the ground pattern 17 of the first embodiment. The ground pattern 17A is embedded between the dielectric layers 121 located between the first surface 12a and the second surface 12b (see FIGS. 5 and 6). The ground pattern 17A is a conductive layer extending along the first surface 12a, and is constituted by a metal layer, for example. At least the one dielectric layer 121 is interposed between the ground pattern 17A and the first surface 12a. The respective ground pads 16 and the ground pattern 17A are connected to each other via the via-holes 19a penetrating the dielectric layer 121. In this manner, the ground pattern 17A is set to the reference potential.

Figure 11:
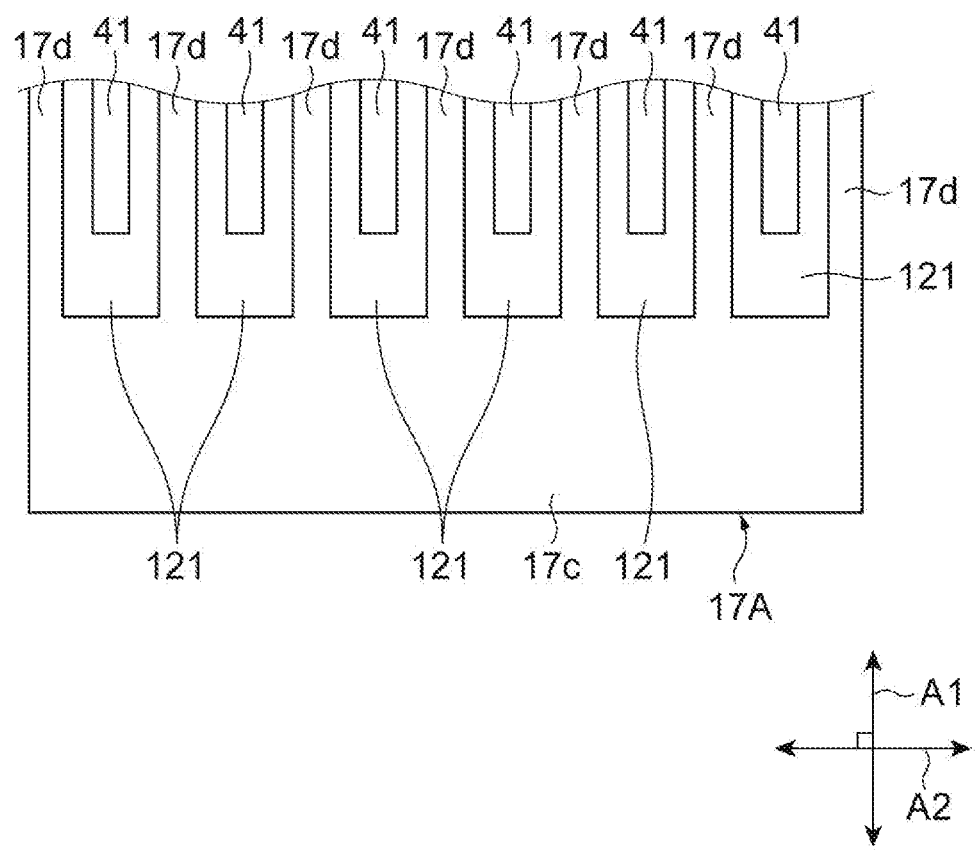
FIG. 11 is a diagram showing a planar shape of a ground pattern 17A.

FIG. 11 is a diagram showing the planar shape of the ground pattern 17A. As shown in FIG. 11, the ground pattern 17A of the present modification includes a portion 17c and a plurality of portions 17d. The portion 17c extends along the terminal surface 12c of the feed-through 12A (i.e., in direction A2), and overlaps the plurality of ground pads 16 as viewed in the normal direction of the first surface 12a. In one example, the portion 17c is exposed from the terminal surface 12c. The portion 17c is connected to each of the plurality of ground pads 16 via the plurality of via-holes 19a (see FIG. 10). The plurality of portions 17d protrude from the portion 17c toward the inside of the housing 11. Each of the plurality of portions 17d is provided for the corresponding one of the plurality of ground pads 16, and overlaps the corresponding ground pad 16 as viewed in the normal direction of the first surface 12a. The respective portions 17d are connected to the corresponding ground pads 16 via the via-holes 19a. According to the ground pattern 17A of the present modification, effect similar to the effects of the ground pattern 17 of the first embodiment can be produced.

Second Embodiment

A package for an optical receiver module according to a second embodiment will be hereinafter described. In the description of the second embodiment, the same description as the description of the first embodiment will be omitted, and only points different from the corresponding points of the first embodiment will be explained. Accordingly, the description of the first embodiment may be referred to in the second embodiment within a technically allowable range.

Figure 12:
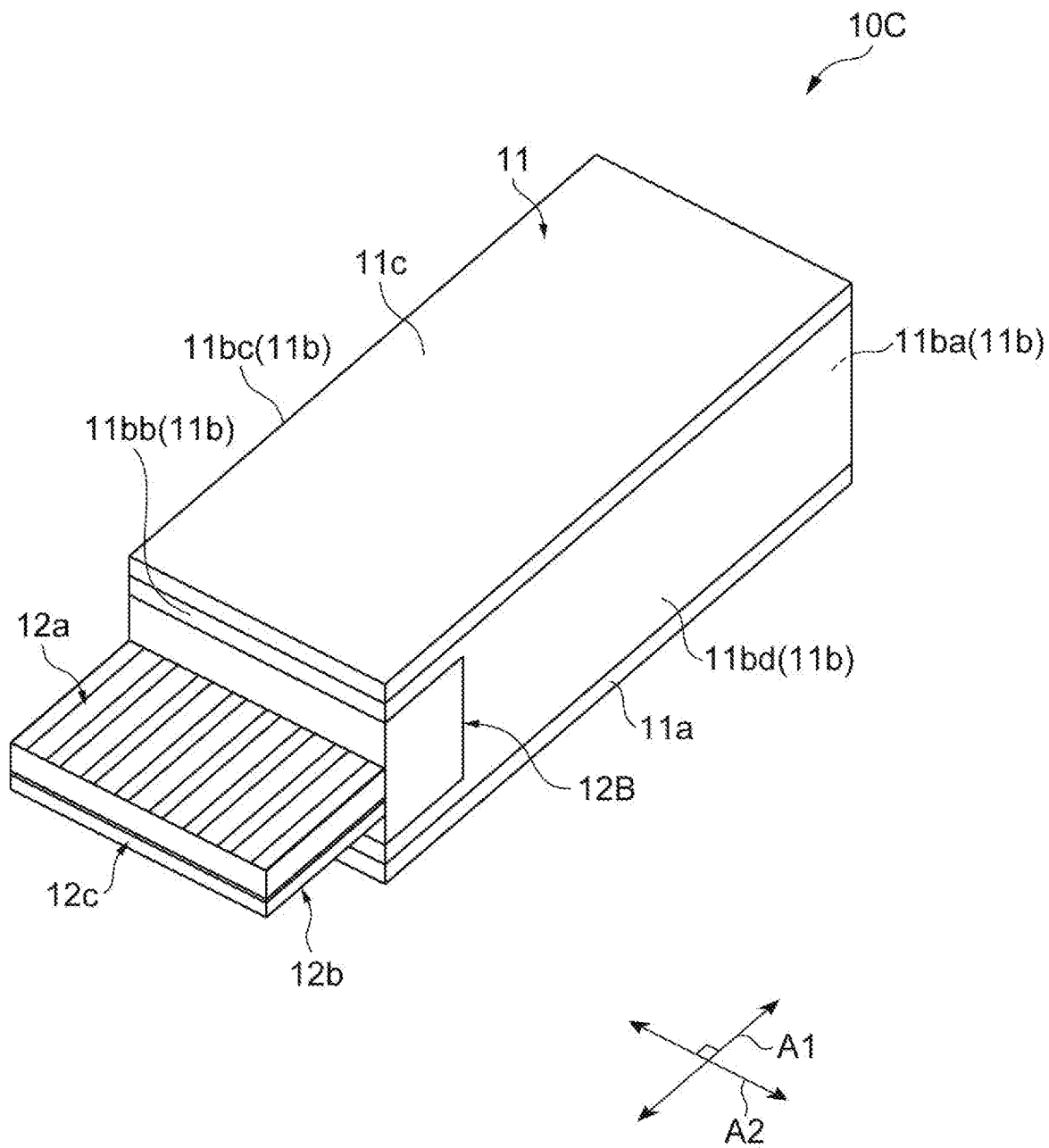
FIG. 12 is a perspective view showing an external appearance of a package 10C.
Figure 13:
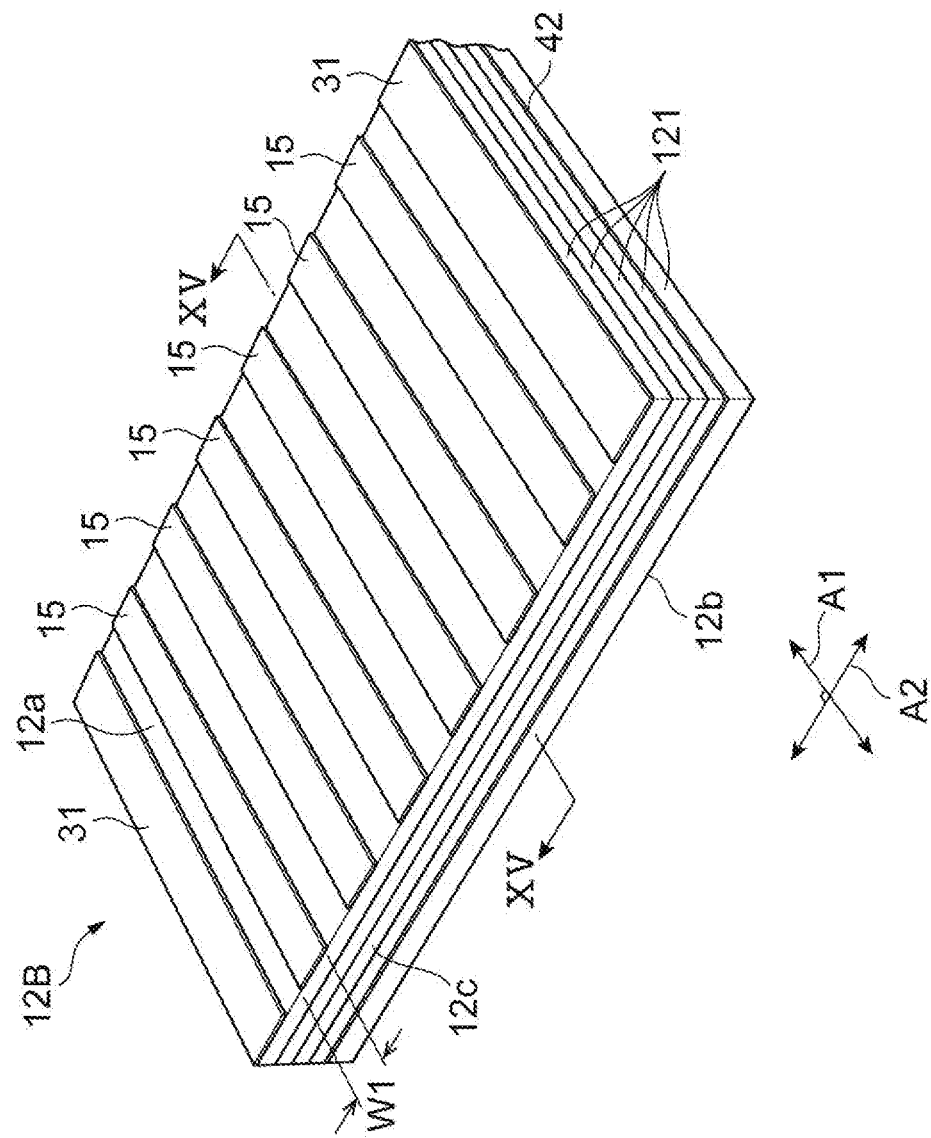
FIG. 13 is an enlarged perspective view showing a part of FIG. 12, depicting only a portion included in the feed-through 12 and protruding from a terminal wall 11bb.

FIG. 12 is a perspective view showing an external appearance of a package 10C. FIG. 13 is an enlarged perspective view showing a part of FIG. 12, depicting only a portion included in a feed-through 12B and protruding from the terminal wall 11bb. The package 10C shown in FIG. 12 differs from the package 10A of the first embodiment in the shape of the feed-through 12B.

As shown in FIG. 13, the plurality of DC pads 15 and a pair of ground pads 31 are provided on the first surface 12a of the feed-through 12B. Each of the plurality of DC pads 15 and the pair of ground pads 31 is a metal film adhered onto the feed-through 12B which is a dielectric. Each of the plurality of DC pads 15 is electrically connected to the corresponding one of the plurality of DC wirings 13 via a wiring embedded inside the feed-through 12B. The plurality of DC pads 15 each have an elongated shape extending in the direction A1, and are disposed side by side along the terminal wall 11bb (i.e., in direction A2). The pair of ground pads 31 is connected to the reference potential via a ground terminal of the flexible printed wiring board 7. The pair of ground pads 31 is disposed at both ends of a row of the plurality of DC pads 15 disposed side by side in the direction A2. In one example, each of the lengths of the DC pads 15 and the ground pads 31 in the direction A1 falls within a range from 0.8 mm to 1.4 mm, while center intervals (pitches) of the adjoining DC pads 15 each fall within a range from 0.3 mm to 0.6 mm. A width W1 of each of the DC pads 15 in the direction A2 falls within a range from 0.1 mm to 0.4 mm.

The ground pattern 42 of the feed-through 12B is embedded between the dielectric layers 121 positioned between the first surface 12a and the second surface 12b. At least the one dielectric layer 121 is interposed between the ground pattern 42 and the first surface 12a, and between the ground pattern 42 and the second surface 12b. The respective ground pads 31 and the ground pattern 42 are electrically connected to each other via not-shown wirings. In this manner, the ground pattern 42 is set to the reference potential.

Figure 14:
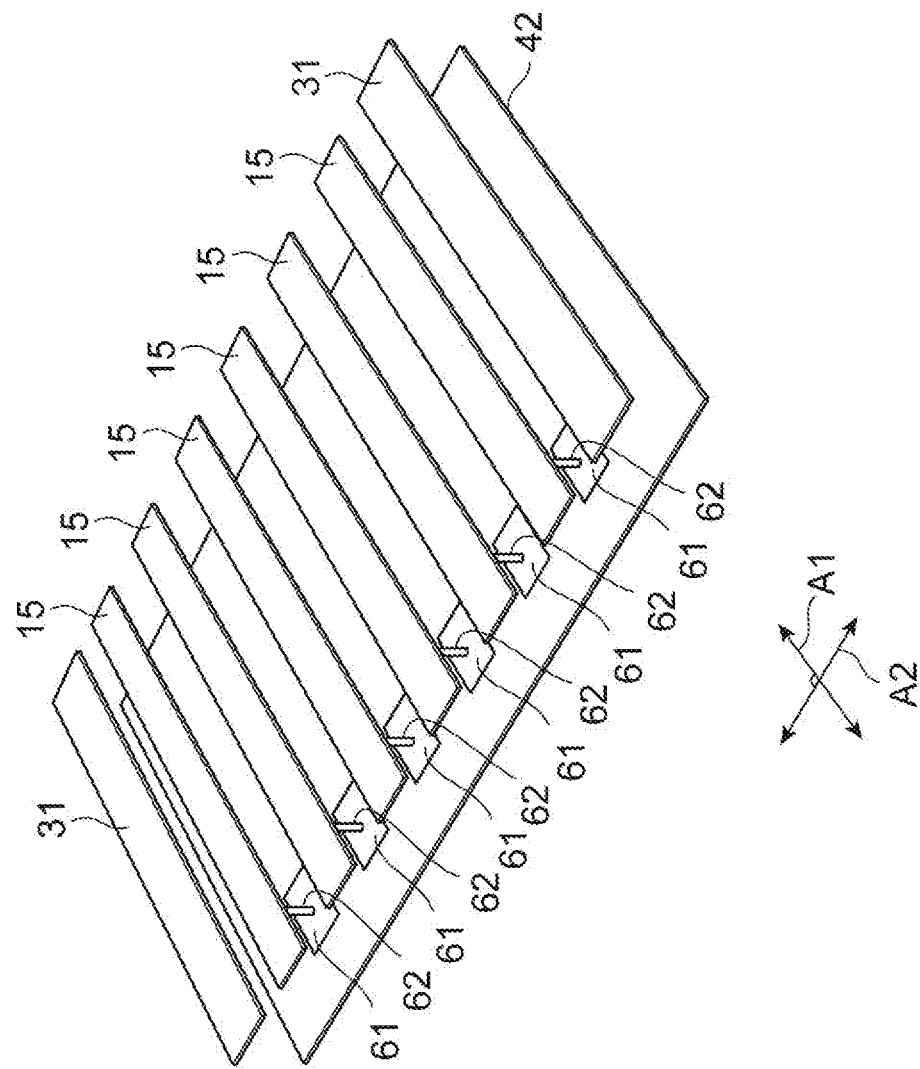
FIG. 14 is a perspective view corresponding to FIG. 13, and showing a state that dielectric layers 121 present between a first surface 12a and a ground pattern 42 have been removed.
Figure 15:
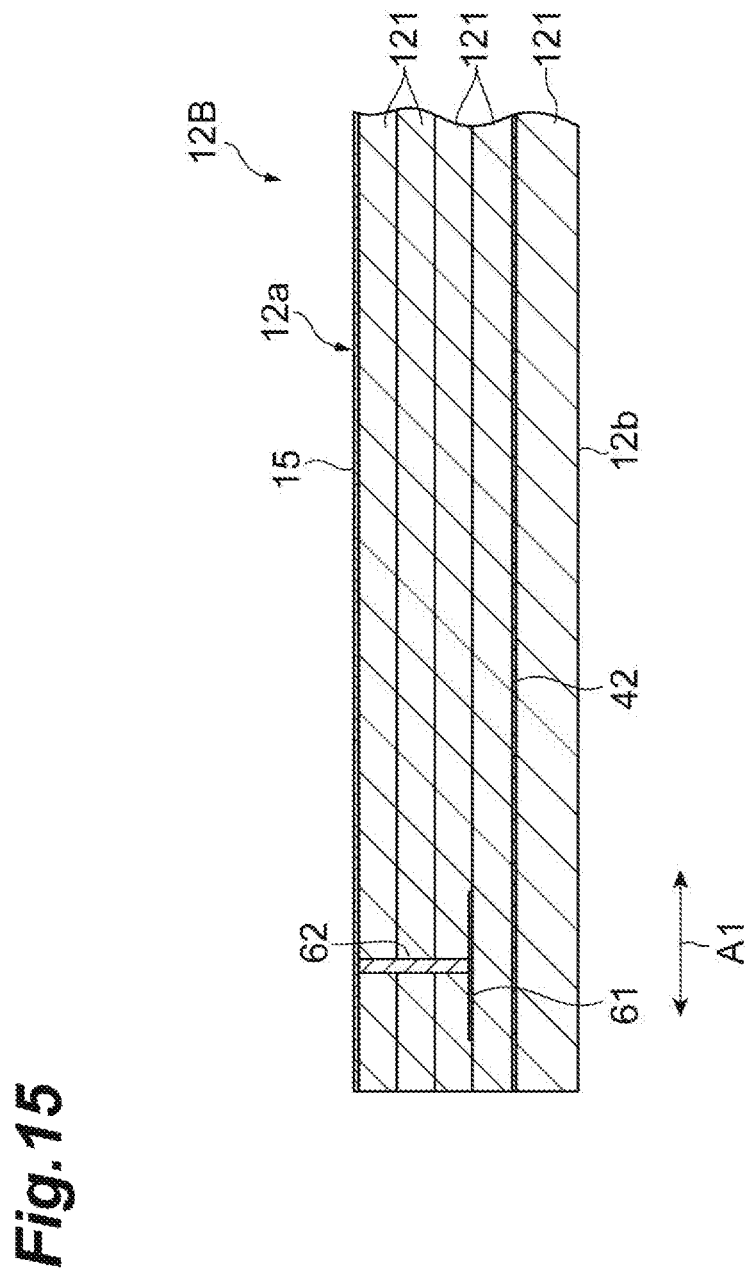
FIG. 15 is a cross-sectional view taken along a line XV-XV in FIG. 13.
Figure 16:
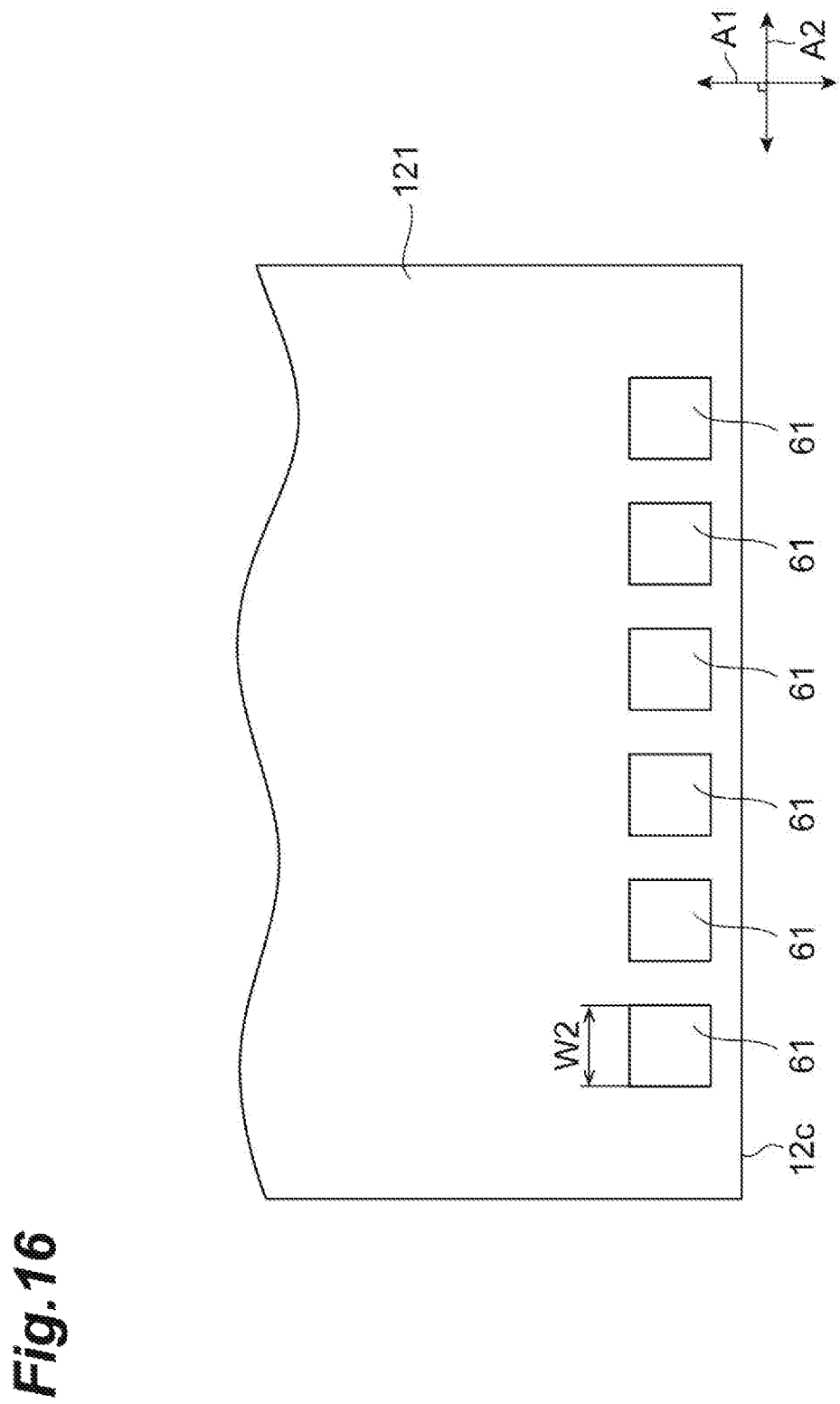
FIG. 16 is a plan view of a plurality of conductive pads 61.

FIG. 14 is a perspective view corresponding to FIG. 13, showing a state that dielectric layers 121 present between a first surface 12a and the ground pattern 42 have been removed. FIG. 15 is a cross-sectional view taken along a line XV-XV in FIG. 13. As shown in FIGS. 14 and 15, at least the one conductive pad 61 is embedded in a surface (third surface) between the first surface 12a and the ground pattern 42 and parallel to the first surface 12a inside the feed-through 12B. The conductive pad 61 is an example of a first conductive pad of the second embodiment. The conductive pad 61 is a conductive film extending along the first surface 12*a*, and is constituted by a metal film, for example. In the second embodiment, a plurality of the conductive pads 61 is embedded. In one example, each of the conductive pads 61 is associated with the corresponding one of the DC pads 15. One of the adjoining DC pads 15 is connected to the conductive pad 61 different from the conductive pad 61 to which the other DC pad 15 is connected. The number of the conductive pads 61 is equal to the number of the DC pads 15. FIG. 16 is a plan view of the plurality of conductive pads 61. Similarly to the plurality of DC pads 15, the respective conductive pads 61 are disposed in a line along the terminal wall 11*bb* (i.e., in direction A2). The plurality of conductive pads 61 may be disposed closer to the terminal surface 12*c* than to the terminal wall 11*bb*. The planar shape of each of the conductive pads 61 may be various shapes such as rectangle, square, polygon, and circle. A width W2 of each of the conductive pads 61 along the terminal wall 11*bb* in the direction A2 may be larger than the width W1 of the corresponding DC pad 15 in the same direction (see FIG. 13).

As shown in FIG. 15, each of the conductive pads 61 is embedded between the dielectric layers 121. Each of the conductive pads 61 faces the ground pattern 42 with at least the one dielectric layer 121 interposed between the conductive pad 61 and the ground pattern 42. The respective conductive pads 61 and the ground pattern 42 are parallel to each other. In one example, the plurality of conductive pads 61 are embedded between the same dielectric layers 121. The conductive pads 61 are separated from an internal wiring of the feed-through 12B which connects the DC pads 15 and the DC wirings 13 (see FIG. 2), and are therefore provided independently from the internal wiring. The plurality of conductive pads 61 are separated from each other. The respective conductive pads 61, and the ground pattern 42 constitute a capacitor. The capacitance value of the capacitor depends on the area of each of the conductive pads 61, and the distance between each of the conductive pads 61 and the ground pattern 42.

As shown in FIGS. 14 and 15, the same number of the via-holes 62 as the number of the conductive pads 61 are further embedded between the first surface 12*a* and the ground pattern 42 inside the feed-through 12B. Each of the conductive pads 61 is electrically connected to the corresponding one of the DC pads 15 via the via-hole 62. Each of the via-holes 62 is a conductive member extending in a thickness direction of the feed-through 12B, and is constituted by a metal member, for example. Each of the via-holes 62 is formed for the corresponding one of the conductive pads 61, and is provided between the DC pad 15 and the conductive pad 61 in the thickness direction of the feed-through 12B. Each of the via-holes 62 penetrates one or a plurality of the dielectric layers 121 present between the DC pad 15 and the conductive pad 61 in the thickness direction. One end of each of the via-holes 62 is in contact with the DC pad 15, while the other end of the via 62 is in contact with the conductive pad 61. The shape of each of the via-holes 62 is a columnar shape or a cylindrical shape, for example. Similarly to the plurality of conductive pads 61, the plurality of via-holes 62 are disposed in a line along the terminal wall 11*bb* (i.e., in direction A2).

Figure 17:
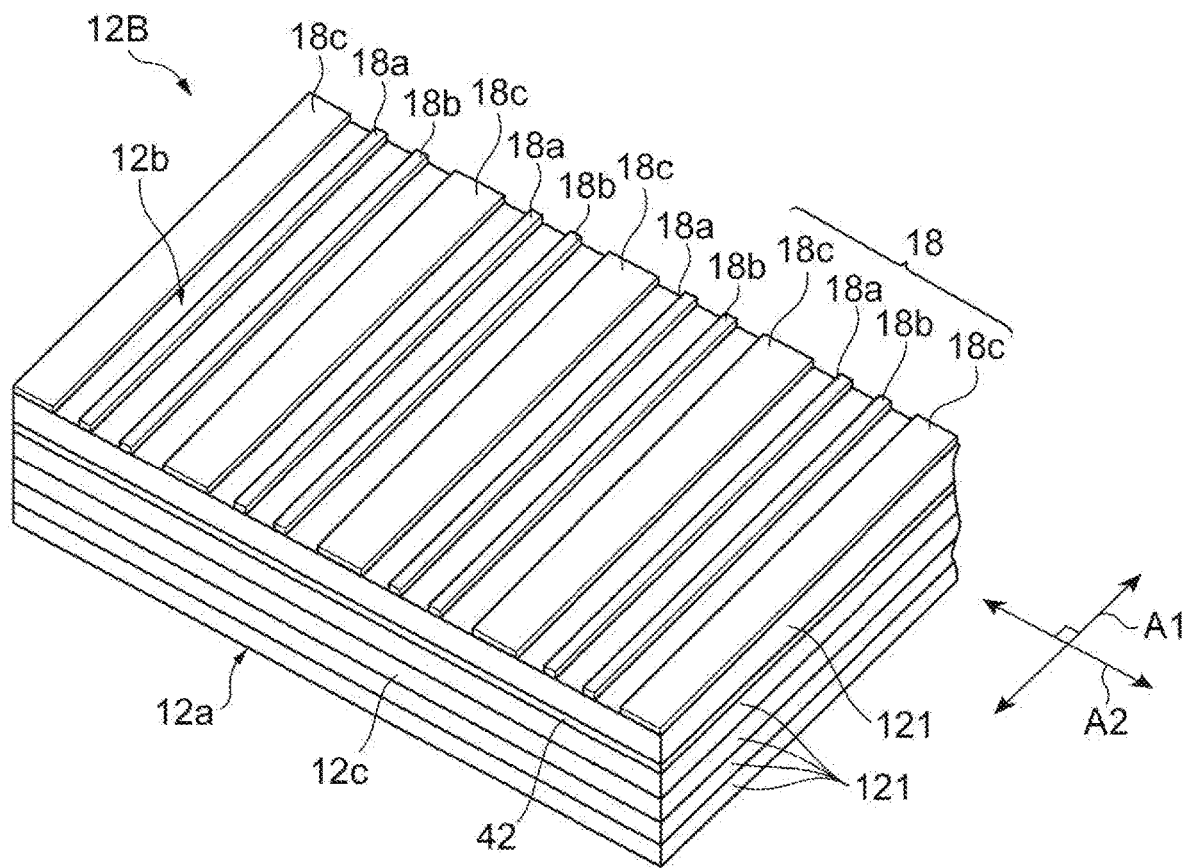
FIG. 17 is an enlarged perspective view showing a part of the external appearance of the package 10A, depicting a portion included in the feed-through 12 and protruding from the terminal wall 11bb as viewed from the second surface 12b.

FIG. 17 is an enlarged perspective view showing a part of the external appearance of the package 10C, depicting a portion included in the feed-through 12B and protruding from the terminal wall 11*bb* as viewed from the second surface 12*b*. According to the second embodiment shown in FIG. 17, at least the one dielectric layer 121 is interposed between the ground pattern 42 and the second surface 12*b* similarly to the first embodiment. The respective ground pads 18*c* and the ground pattern 42 are electrically connected via via-holes penetrating the dielectric layers 121. The ground pattern 42 and the respective radio-frequency signal pads 18 are capable of constituting a microstrip line.

Figure 18A:
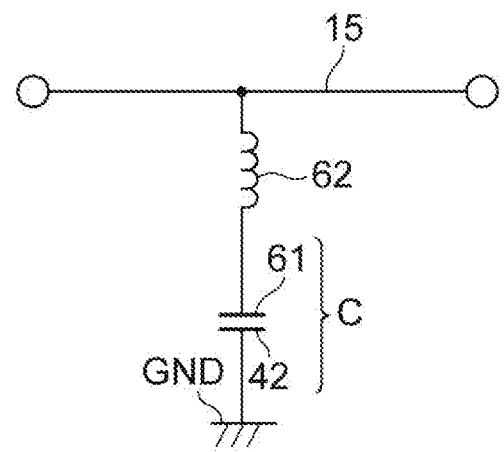

According to the package 10C of the second embodiment described above, at least the one conductive pad 61 is embedded between the ground pattern 42 and the first surface 12*a*. Each of the conductive pads 61 faces the ground pattern 42, and is electrically connected to the corresponding one of the DC pads 15 via the via-hole 62. FIG. 18A is a diagram showing an equivalent circuit constituted by the conductive pad 61, the via-hole 62, and the ground pattern 42. As shown in the figure, a capacitor C is constituted by the conductive pad 61 and the ground pattern 42. The capacitor C and the via-hole 62 corresponding to an inductor are connected in series between the DC pad 15 and a reference potential line GND. In this case, an LC resonance circuit is formed between the DC pad 15 and the reference potential line GND.

Figure 18B:
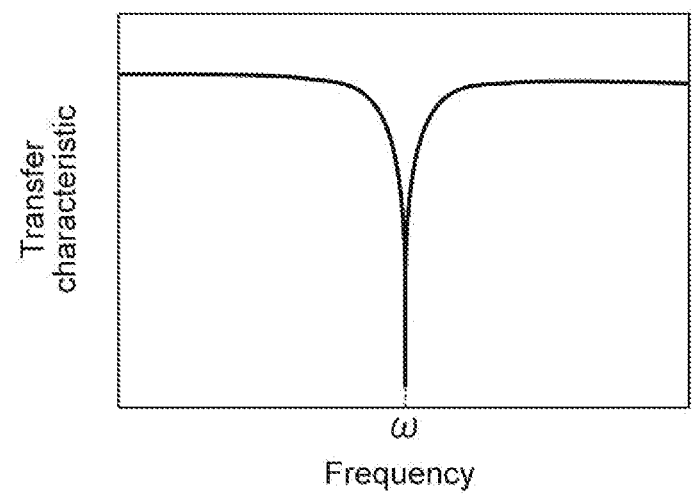
FIG. 18B is a graph schematically showing frequency transfer characteristics of the DC pad 15.

FIG. 18B is a graph schematically showing frequency transfer characteristics of the DC pad 15 of the second embodiment. As shown in the figure, attenuation of the DC pad 15 rapidly increases at a certain frequency ω. The frequency ω coincides with a resonance frequency of the LC resonance circuit described above. In this case, high frequency electromagnetic noise does not easily pass through the DC pad 15 at a frequency around the resonance frequency. Accordingly, the high frequency electromagnetic noise transmitted through the DC pad 15 attenuates when the resonance frequency approaches the frequency of the electromagnetic noise. Reduction of intrusion of electromagnetic noise into the optical receiver module 2 via the DC wirings 13 and the DC pads 15 of the feed-through 12B is therefore achievable.

Figure 19:
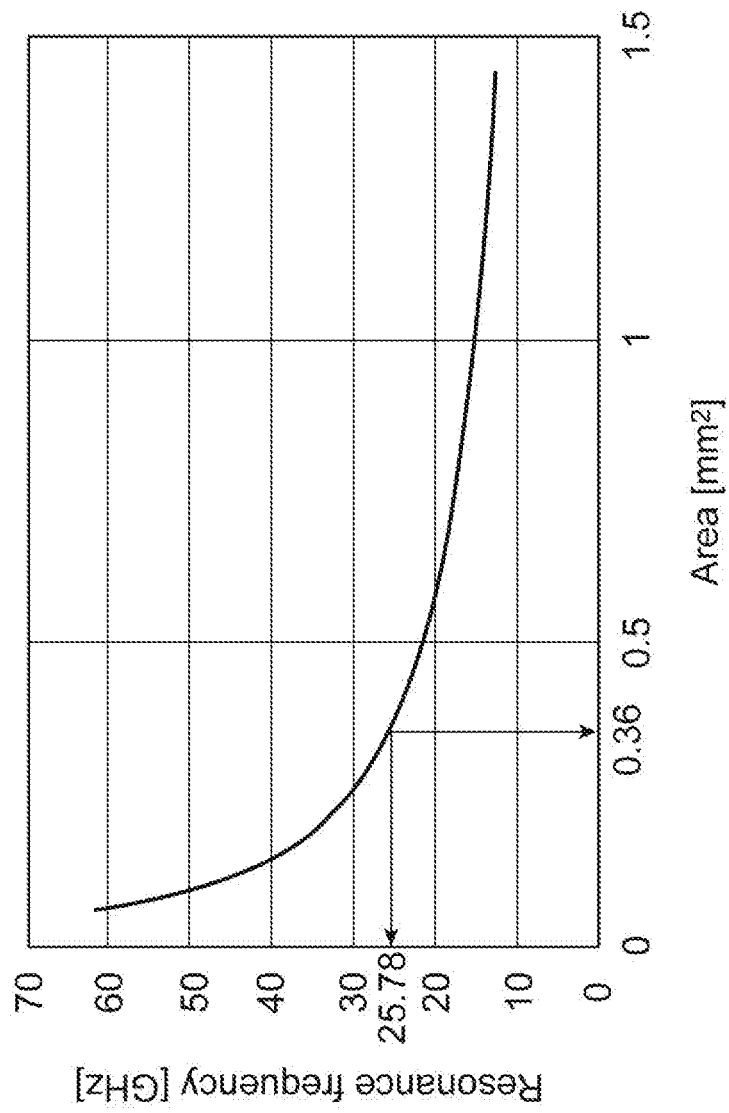
FIG. 19 is a graph showing a relationship between an area of the conductive pad 61 and a resonance frequency.

A design example of the resonance frequency ω will be herein described. In this example, the via-hole 62 has a diameter of 0.05 mm, and a length of 0.457 mm in the thickness direction of the dielectric layer 121. The distance between the conductive pad 61 and the ground pattern 42 (i.e., thickness of dielectric layer 121 between conductive pad 61 and ground pattern 42) is 0.152 mm, while the dielectric constant of the dielectric layer 121 is 9.2. FIG. 19 is a graph showing a relationship between an area of the conductive pad 61 and a resonance frequency in this case. As apparent from FIG. 19, electromagnetic noise of 25.78 GHz can be selectively reduced when the area of the conductive pad 61 is 0.36 mm$^2$.

When the wiring between the optical transmitter module 3 and the driving circuit 4*a* shown in FIG. 1 is a noise source, the frequency of the generated electromagnetic noise lies chiefly in a band of 25 GHz (more specifically, 25 to 28 GHz) or a band of 50 GHz band (more specifically, 50 to 56 GHz). These frequency bands correspond to a transmission frequency band chiefly used in recent optical communication, or a second harmonic of this transmission frequency band. Accordingly, it is advantageous that the area of the conductive pad 61 is adjusted such that the resonance frequency of the LC resonance circuit is contained in either one of these frequency bands.

The width W2 of each of the conductive pads 61 in the direction A2 along the terminal wall 11*bb* (see FIG. 16) may be larger than the width W1 of the corresponding DC pad 15 in the same direction (see FIG. 13). In this case, a sufficient capacitance can be secured between the conductive pad 61 and the ground pattern 42. Accordingly, even when the frequency of electromagnetic noise generated from a noise source (e.g., wiring between optical transmitter module 3 and driving circuit 4a) is a relatively low frequency, the resonance frequency of the resonance circuit becomes sufficiently close to this frequency.

The radio-frequency signal pad 18, which is a transmission line electrically connected to the radio-frequency signal wiring 14, may be provided on the second surface 12b. In this case, the ground pattern 42 and the radio-frequency signal pad 18 are capable of constituting a microstrip line. Specifically, intrusion of electromagnetic noise into the optical receiver module 2 via the DC wirings 13 and the DC pads 15 can be reduced by using the ground pattern which constitutes the microstrip line with the radio-frequency signal pad 18.

The plurality of conductive pads 61 may be disposed side by side along the terminal wall 11bb. In this manner, the electromagnetic noise reduction effect described above is achievable for the plurality of DC pads 15. In addition, the conductive pads 61 can be efficiently disposed inside the small-sized feed-through 12B.

As described above, the planar shape of the conductive pad 61 is not particularly limited to any shape. For example, the conductive pad 61 has a rectangular shape. As the frequency of electromagnetic noise as a reduction target increases, the area of each of the conductive pads 61 decreases. Accordingly, in consideration of positional deviation between the dielectric layers 121 caused during manufacturing, the planar shape of each of the conductive pads 61 may be close to a circular shape when the frequency of the electromagnetic noise is high.

(First Modification)

Figure 20:
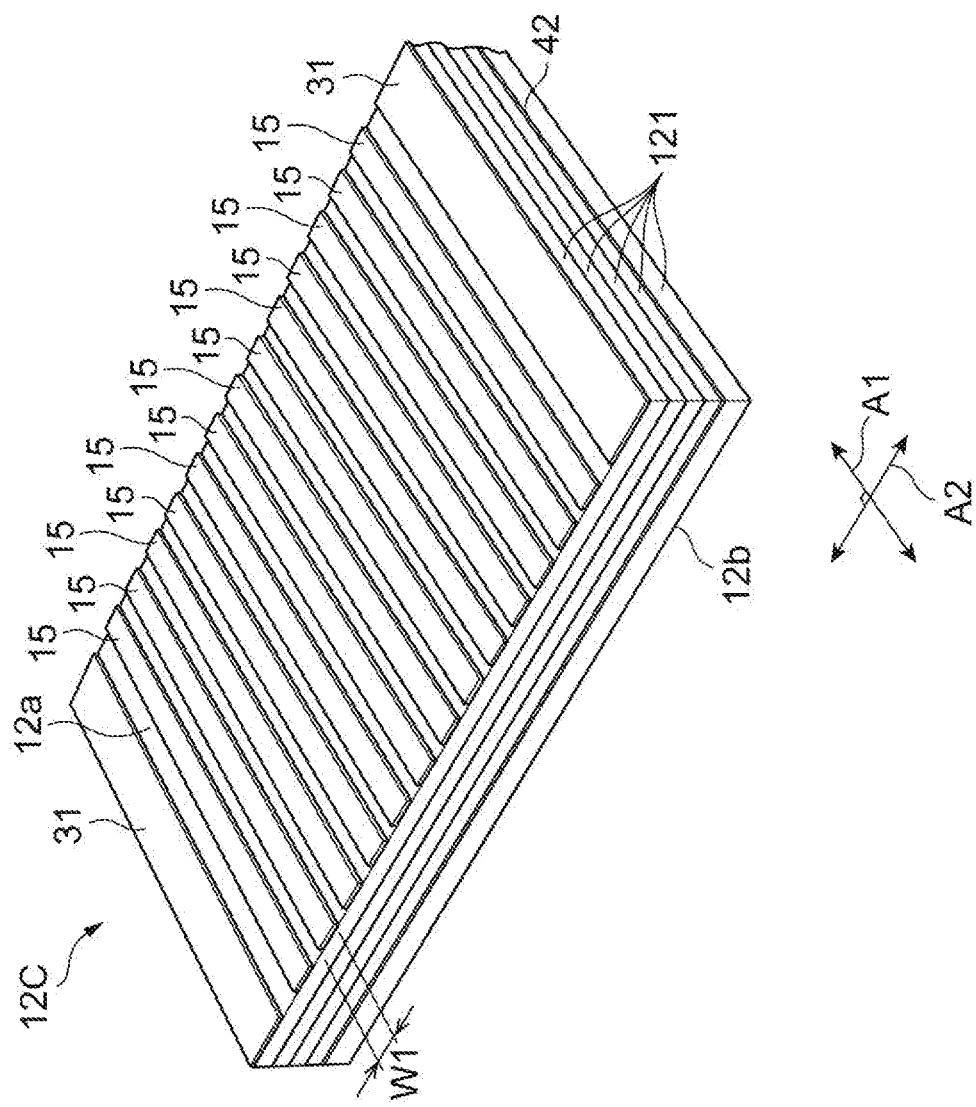
FIG. 20 is a perspective view showing an enlarged feed-through 12A according to a first modification, depicting a portion protruding from the terminal wall 11bb.

FIG. 20 is a perspective view showing an enlarged feed-through 12C according to a first modification of the second embodiment, depicting a portion protruding from the terminal wall 11bb. In the first modification, the number of DC pads 15 is larger than that number in the second embodiment. Accordingly, center intervals (pitches) of the adjoining DC pads 15 decrease, and the width W1 of each of the DC pads 15 in the direction A2 decreases.

Figure 21:
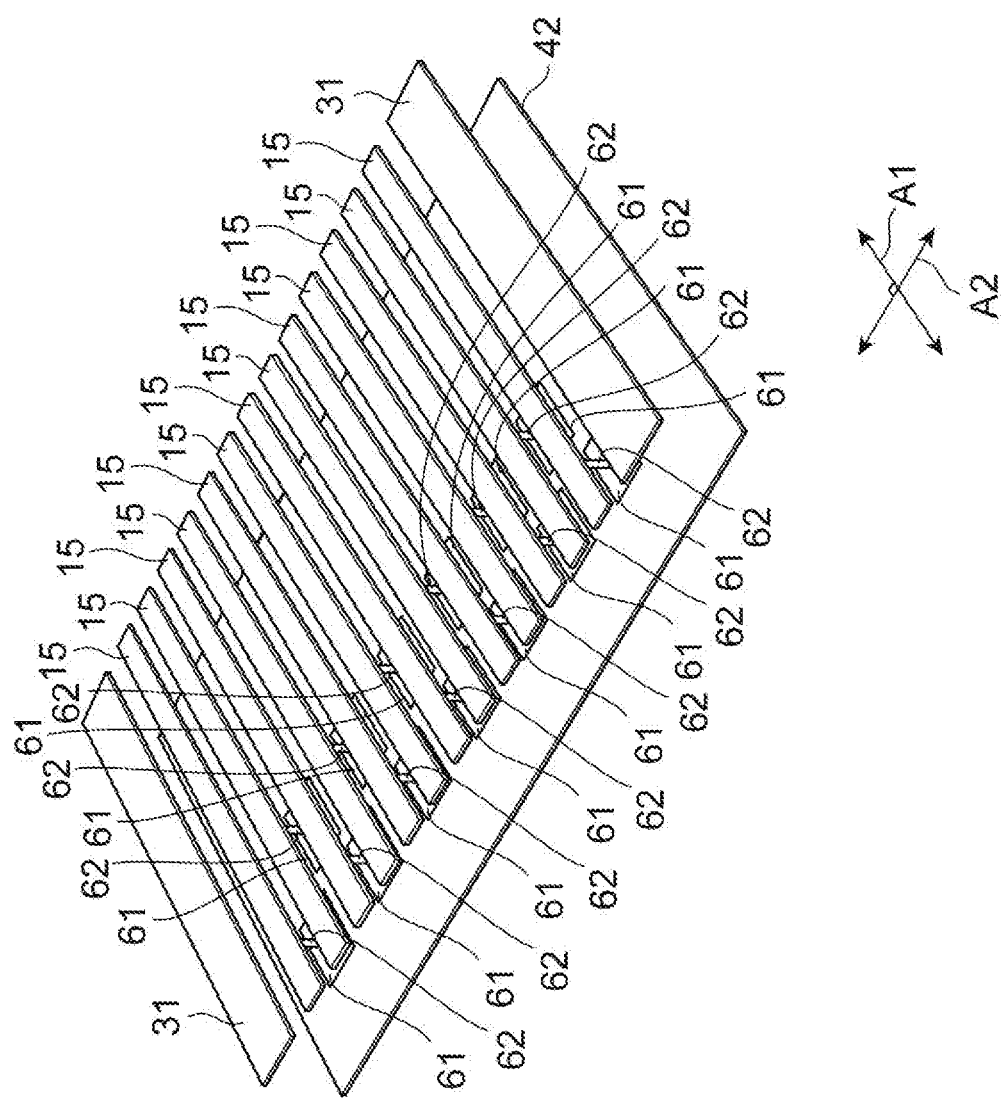
FIG. 21 is a perspective view corresponding to FIG. 20, showing a state that the dielectric layers 121 present between the first surface 12a and the ground pattern 42 have been removed.
Figure 22:
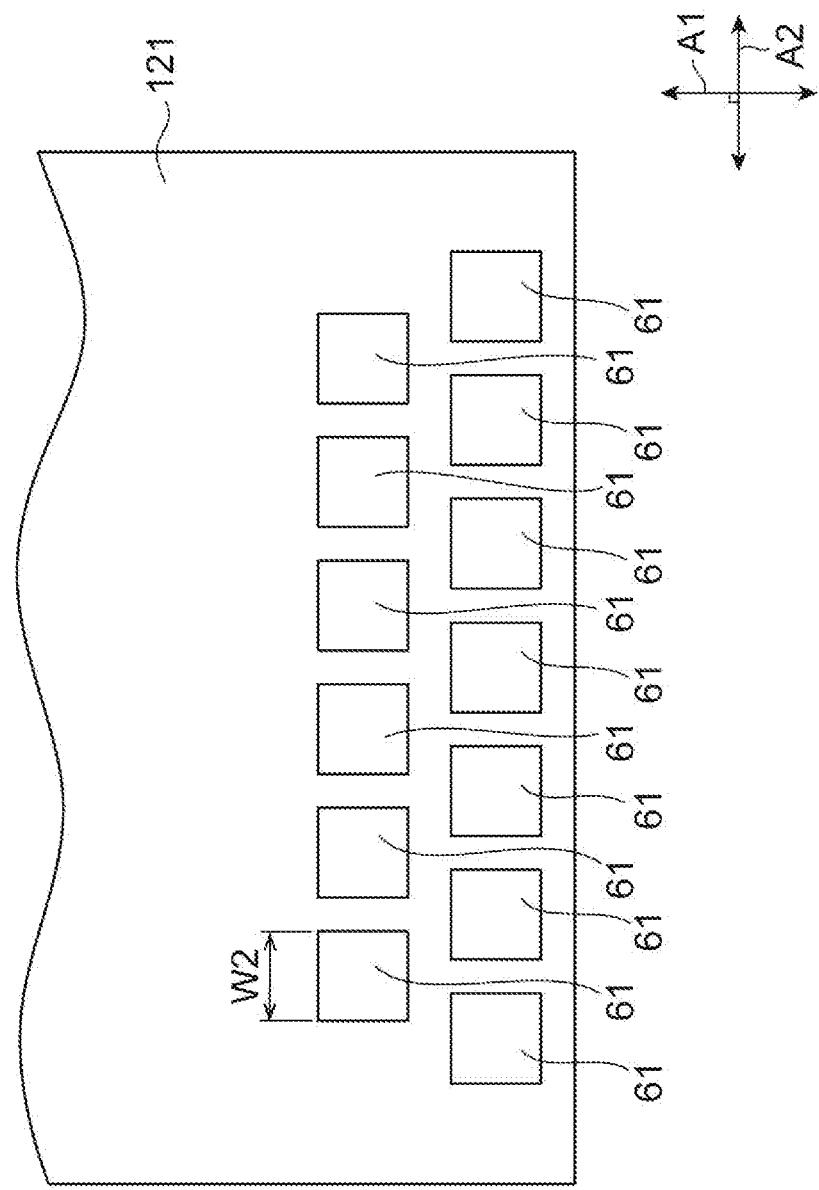
FIG. 22 is a plan view of the plurality of conductive pads 61 in the first modification.

FIG. 21 is a perspective view corresponding to FIG. 20, showing a state that the dielectric layers 121 present between the first surface 12a and the ground pattern 42 have been removed. As shown in FIG. 21, a plurality of the conductive pads 61 are embedded between the first surface 12a and the ground pattern 42. Each of the conductive pads 61 is associated with the corresponding one of the DC pads 15. One of the adjoining DC pads 15 is connected to the conductive pad 61 different from the conductive pad 61 to which the other DC pad 15 is connected. The number of the conductive pads 61 is equal to the number of the DC pads 15. FIG. 22 is a plan view of the plurality of conductive pads 61 in the first modification. The respective conductive pads 61 are arranged in two or more rows each extending along the terminal wall 11bb. FIG. 22 shows two rows by way of example. Specifically, a part of the conductive pads 61 included in the plurality of conductive pads 61 are disposed in a line in the direction A2, while the remaining conductive pads 61 included in the plurality of conductive pads 61 are arranged in a line in the direction A2. These rows are disposed side by side in the direction A1. The conductive pads 61 belonging to one of the rows, and the conductive pads 61 belonging to the other row are arranged alternately (in staggered manner) in the direction A2.

As shown in FIG. 21, each of the conductive pads 61 is electrically connected to the corresponding DC pad 15 via the via-hole 62. Each of the conductive pads 61 belongs to the row different from the row to which the conductive pad 61 connected to the DC pad 15 adjacent to the DC pad 15 connected to the corresponding conductive pad 61 belongs. In other words, one of the two conductive pads 61 connected to the adjoining DC pads 15 is disposed in the row different from the row where the DC pad 15 to which the other conductive pad 61 is connected is disposed. When the plurality of DC pads 15 are numbered sequentially from the end of a plurality of the DC pads 15 for the two rows of the conductive pads 61, the conductive pads 61 belonging to one of the rows are connected to the odd-numbered DC pad 15. On the other hand, the conductive pads 61 belonging to the other row are connected to the even-numbered DC pads 15.

In the first modification, the plurality of conductive pads 61 may be similarly disposed closer to the terminal surface 12c than to the terminal wall 11bb. The planar shape of each of the conductive pads 61 may be any shapes such as rectangle, square, polygon, and circle. The width W2 of each of the conductive pads 61 in the direction A2 along the terminal wall 11bb may be larger than the width W1 of the corresponding DC pad 15 in the same direction.

Similarly to the second embodiment, the capacitor may be constituted by the conductive pad 61 and the ground pattern 42 in the first modification. In this case, the corresponding capacitor and the via-hole 62 as the inductor constitute an LC resonance circuit between the DC pad 15 and a reference potential line. Accordingly, high frequency electromagnetic noise transmitted through the DC pad 15 attenuates when the resonance frequency approaches the frequency of the electromagnetic noise. In this manner, intrusion of electromagnetic noise into the optical receiver module 2 through the DC wirings 13 and the DC pads 15 of the feed-through 12B can be reduced.

In addition, according to the first modification, the plurality of conductive pads 61 are arranged in two or more rows each extending along the terminal wall 11bb. This configuration efficiently positions the conductive pads 61 in the small-sized feed-through 12B while securing the width W2 sufficient for the respective conductive pads 61. Moreover, each of the conductive pads 61 belongs to the row different from the row to which the conductive pad 61 connected to the DC pad 15 adjacent to the DC pad 15 connected to the corresponding conductive pad 61 belongs. Accordingly, the lengths of the via-holes 62 are equalized to a short length.

(Second Modification)

Figure 23:
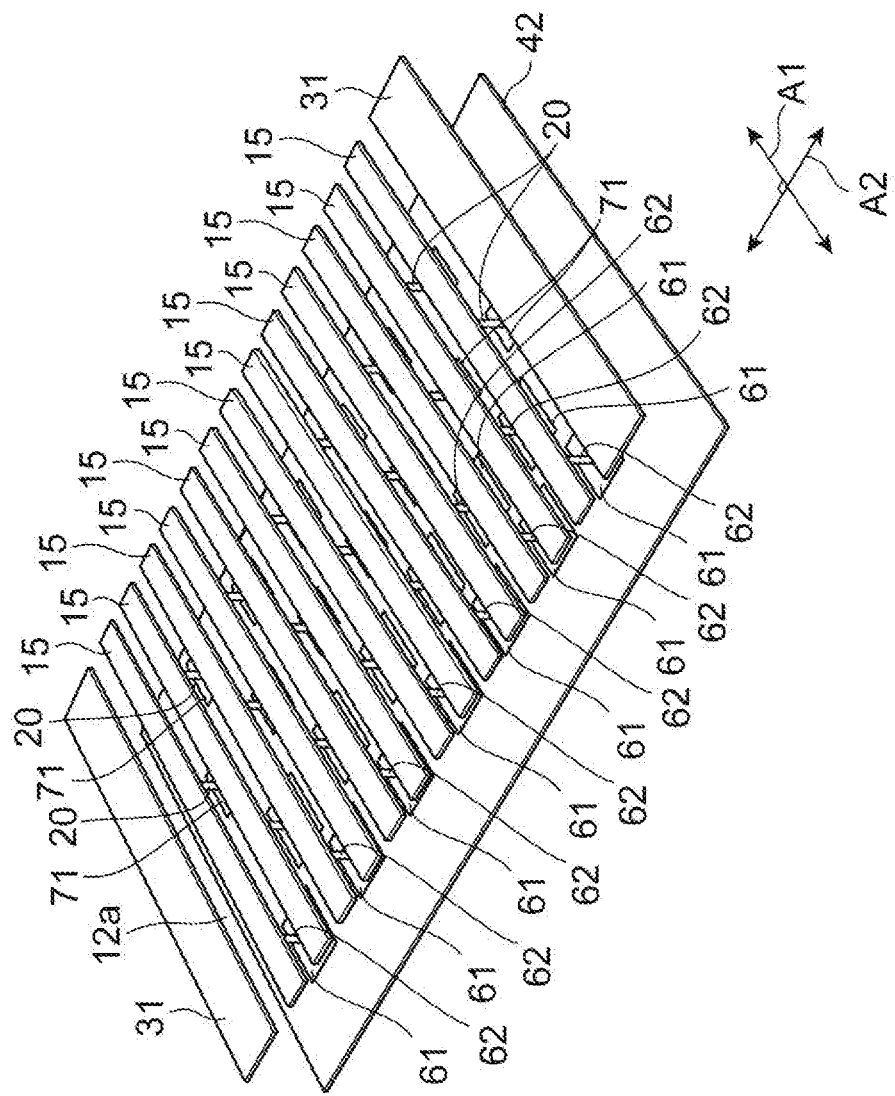
FIG. 23 is a perspective view showing a configuration of a feed-through according to a second modification, depicting the portion protruding from the terminal wall 11bb in a state that the dielectric layers 121 present between the first surface 12a and the ground pattern 42 have been removed.
Figure 24:
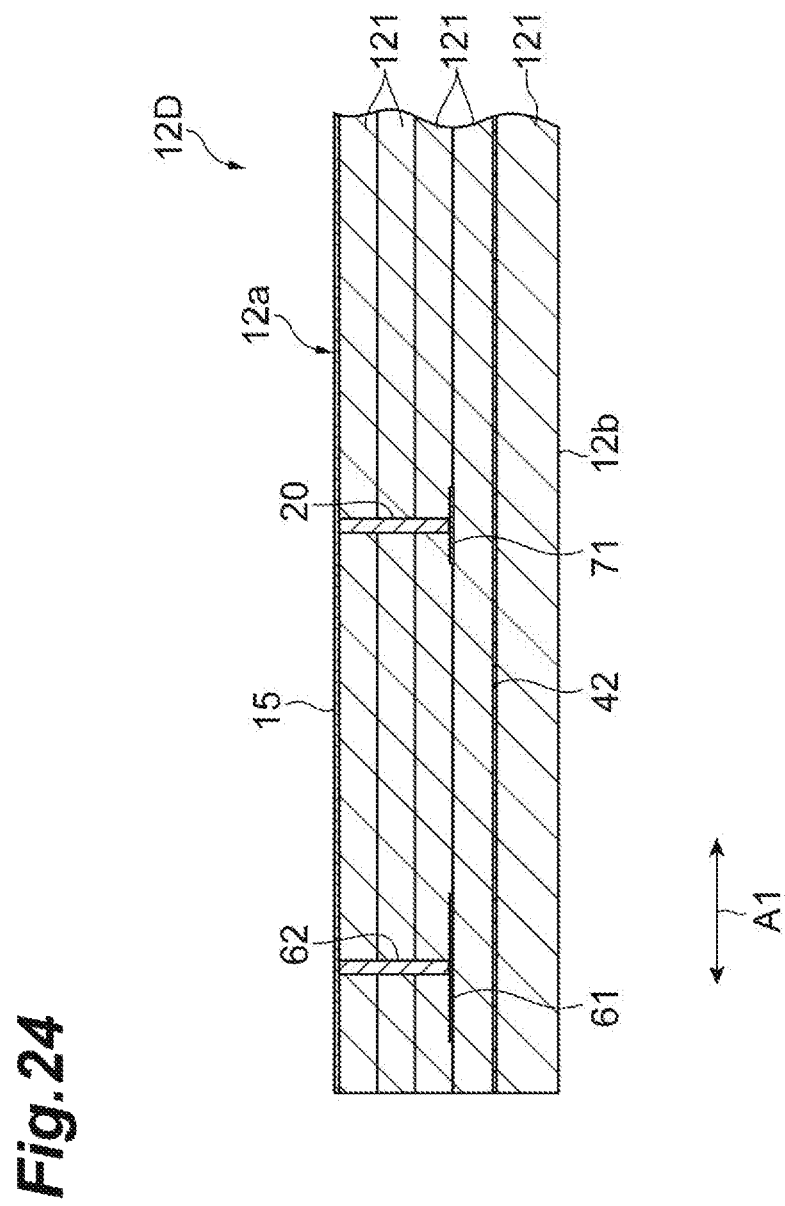
FIG. 24 is a cross-sectional view of a feed-through 12B taken in a direction A1 according to a second modification.

FIG. 23 is a perspective view showing a configuration of a feed-through according to a second modification of the second embodiment, depicting the portion protruding from the terminal wall 11bb in a state that the dielectric layers 121 present between the first surface 12a and the ground pattern 42 have been removed. FIG. 24 is a cross-sectional view of a feed-through 12D taken in a direction A1 according to the second modification. An external appearance of the corresponding part of the feed-through is similar to the external appearance of the corresponding part of the first modification, and therefore is not shown in the figure. As shown in FIGS. 23 and 24, the feed-through 12D of the present modification includes at least the one conductive pad 71 in addition to the configuration of the feed-through 12B of the second embodiment. The conductive pad 71 is embedded in a surface (third surface) between the first surface 12a and the ground pattern 42 and parallel to the first surface 12a inside the feed-through 12D.

Figure 25:
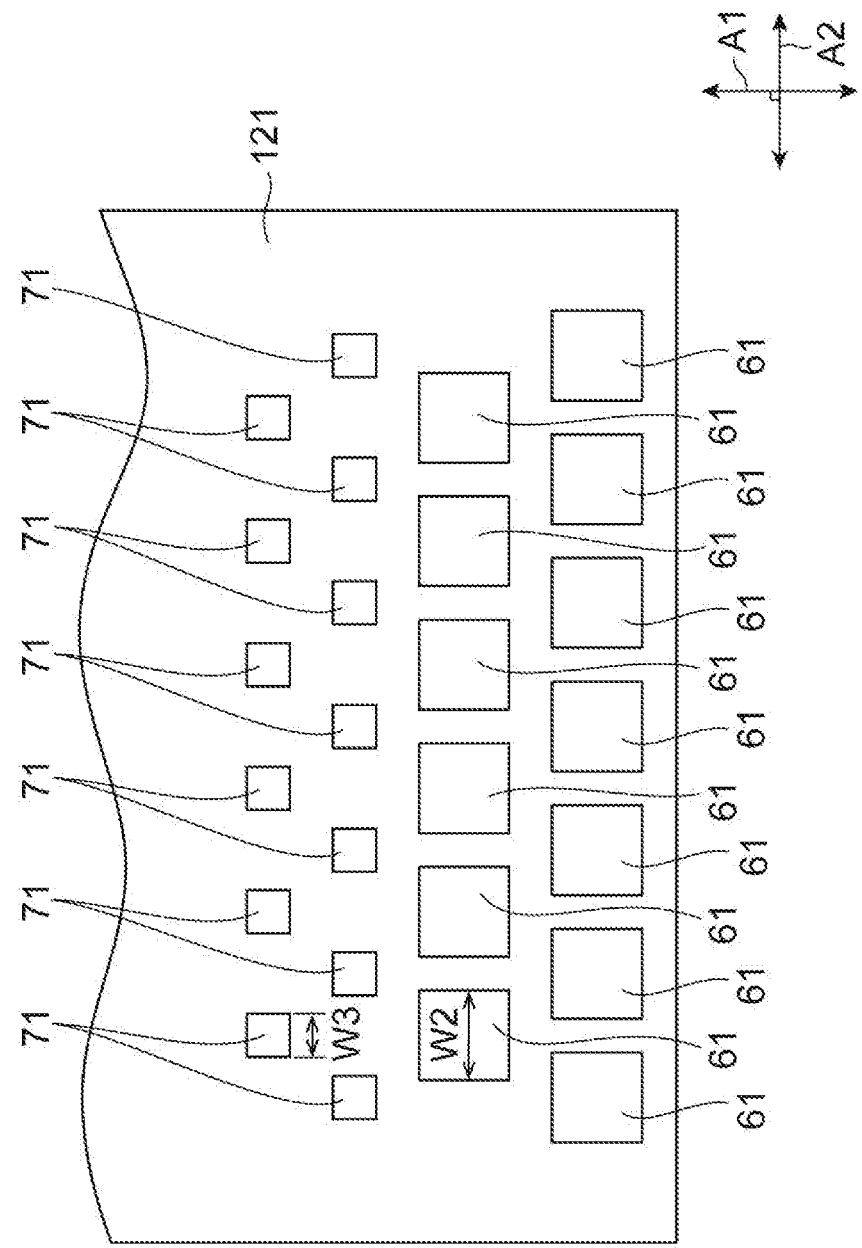
FIG. 25 is a plan view showing a plurality of the conductive pads 61 and a plurality of conductive pads 71.

The conductive pad 71 is an example of a second conductive pad in the present modification. The conductive pad 71 is a conductive film extending along the first surface 12a, and is constituted by a metal film, for example. In the second embodiment, a plurality of the conductive pads 71 is embedded. In one example, each of the conductive pads 71 is associated with the corresponding one of the DC pads 15. The number of the conductive pads 71 is equal to the number of the DC pads 15. FIG. 25 is a plan view showing a plurality of the conductive pads 61 and a plurality of the conductive pads 71. Similarly to the conductive pads 61, the conductive pads 71 are disposed in a line, or two or more lines along the terminal wall 11bb (i.e., in direction A2). The plurality of conductive pads 71 may be disposed between the plurality of conductive pads 61 and the terminal wall 11bb. The planar shape of each of the conductive pads 71 may be various shapes such as rectangle, square, polygon, and circle. A width W3 of each of the conductive pads 71 in the direction A2 along the terminal wall 11bb may be either larger or smaller than the width W1 of the corresponding DC pad 15 in the same direction (see FIG. 20).

The area of each of the conductive pads 71 herein is different from the area of the conductive pad 61 connected to the same DC pad 15. FIG. 25 shows a case where the area of each of the conductive pads 71 is smaller than the area of each of the conductive pads 61 by way of example. More specifically, in the example shown in FIG. 25, the width W3 of each of the conductive pads 71 in the direction A2 is smaller than the width W2 of each of the conductive pads 61 in the same direction.

As shown in FIG. 24, the respective conductive pads 71 are embedded between the dielectric layers 121 (e.g., between the same layers as the layers between which the conductive pads 61 are disposed). Each of the conductive pads 61 faces the ground pattern 42 with at least the one dielectric layer 121 interposed between the conductive pad 61 and the ground pattern 42. The respective conductive pads 71 and the ground pattern 42 are parallel to each other. In one example, the plurality of conductive pads 71 are embedded between the same dielectric layers 121. The conductive pads 71 are separated from an internal wiring of the feed-through 12D which connects the DC pads 15 and the DC wirings 13 (see FIG. 2), and are therefore provided independently from the internal wiring. The plurality of conductive pads 71 are separated from each other. The respective conductive pads 71, and the ground pattern 42 constitute a capacitor. The capacitance value of the capacitor depends on the area of each of the conductive pads 71, and the distance between each of the conductive pads 71 and the ground pattern 42.

As shown in FIGS. 23 and 24, the same number of the via-holes 20 as the number of the conductive pads 71 are further embedded between the first surface 12a and the ground pattern 42 inside the feed-through 12D. Each of the conductive pads 71 is electrically connected to the corresponding one of the DC pads 15 via the via-hole 20. Each of the via-holes 20 is a conductive member extending in a thickness direction of the feed-through 12D, and is constituted by a metal member, for example. Each of the via-holes 20 is formed for the corresponding one of the conductive pads 71, and is provided between the DC pad 15 and the conductive pad 71 in the thickness direction of the feed-through 12D. Each of the via-holes 20 penetrates one or a plurality of the dielectric layers 121 present between the DC pads 15 and the conductive pads 71 in the thickness direction. One end of each of the via-holes 20 is in contact with the DC pad 15, while the other end of the via-hole 20 is in contact with the conductive pad 71. The shape of each of the via-holes 20 is a columnar shape or a cylindrical shape, for example. Similarly to the plurality of conductive pads 71, the plurality of via-holes 20 are disposed in a line, or two or more lines along the terminal wall 11bb (i.e., in direction A2).

The conductive pad 61 and the ground pattern 42 constitute a capacitor similarly in the second modification. This capacitor and the via-hole 62 as the inductor constitute an LC resonance circuit between the DC pad 15 and a reference potential line. Moreover, the conductive pad 71 and the ground pattern 42 constitute a different capacitor in the second modification. This different capacitor and the via-hole 20 as the inductor constitute a different LC resonance circuit between the DC pad 15 and the reference potential line. The area of each of the conductive pads 61 is different from the area of each of the conductive pads 71, and therefore the capacitance values of these capacitors are different. In this case, the resonance frequency of the resonance circuit constituted by the conductive pad 61 and the via-hole 62 of the conductive pad 61 is different from the resonance frequency of the resonance circuit constituted by the conductive pad 71 and the via-hole 20 of the conductive pad 71. Accordingly, even when electromagnetic noise contains two frequencies, effective attenuation of electromagnetic noise is achievable for each frequency.

Figure 26:
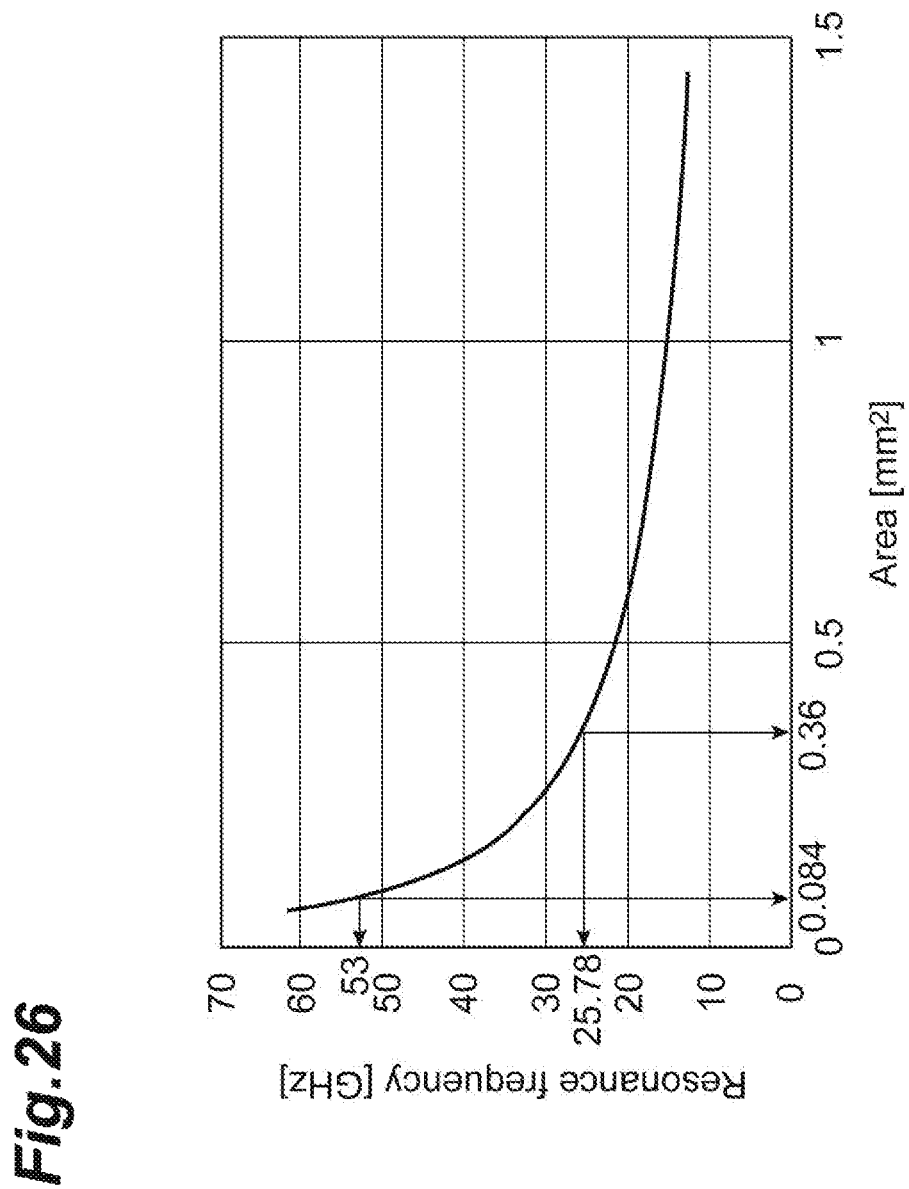
FIG. 26 is a graph showing a relationship between areas of the conductive pad 61 and 71 and a resonance frequency.

FIG. 26 is a graph showing a relationship between areas of the conductive pads 61 and 71 and a resonance frequency. It is assumed that the diameter and length of the via-hole 62, the distance between the conductive pad 61 and the ground pattern 42, and the dielectric constant of the dielectric layers 121 are equivalent to the corresponding values in the example of FIG. 19. As apparent from FIG. 26, electromagnetic noise of 25.78 GHz can be selectively reduced when the area of the conductive pad 61 is 0.36 mm$^2$. When the area of the conductive pad 71 is 0.084 mm$^2$, electromagnetic noise of 53 GHz can be selectively reduced. Accordingly, electromagnetic noise of 25.78 GHz and 53 GHz can be simultaneously reduced.

The package for the optical receiver module according to the present disclosure is not limited to the examples described in the respective embodiments, but may be modified in various different manners. For example, in the first embodiment and the modification of the first embodiment, the ground patterns 17 and 17A are provided inside the feed-throughs 12 and 12A, respectively. However, these ground patterns may be eliminated as necessary. In the first embodiment, the one ground pad 16 and the two DC pads 15 are alternately disposed. In the modification, the one ground pad 16 and the one DC pad 15 are alternately disposed. However, the arrangement order of the DC pad 15 and the ground pad 16 may be freely changed as long as at least each of the DC pads 15 is adjacent to the one ground pad 16.

In the second embodiment and the respective modifications of the second embodiment, for example, the one or two conductive pads are connected to each of the DC pads. However, the three or more conductive pads may be connected to each of the DC pads. In this case, the areas of the three or more conductive pads may be different from each other. In the second embodiment and the respective modifications of the second embodiment, the conductive pads are connected to all the DC pads. However, the conductive pads may be connected to only some of the DC pads. In the second embodiment and the respective modifications of the second embodiment, the resonance frequency is controlled by changing the area of each of the conductive pads. Alternatively, the clearance between the conductive pads and the ground pattern may be changed, or at least either the cross-sectional area or the length of each of the via-holes may be changed. The resonance frequency can be easily controlled by using at least one of these methods.

What is claimed is:

1. A package for an optical receiver module, the package comprising:
    a housing for enclosing a semiconductor optical device therein, the housing having electrically conductive walls including a rear wall and a pair of side walls each extending from the rear wall; and
    a feed-through in the rear wall of the housing,
    wherein the feed-through includes:
        an internal portion made of an insulating material; and
        an external portion made of the insulating material, the external portion protruding from the internal portion outwardly from the housing and having a top face and a back face, the top face of the external portion including DC lines and ground lines, the back face including transmission lines comprising signal lines and ground lines,
    wherein at least one of the ground lines provided on the top face of the external portion is located adjacent to at least one side of at least one of the DC lines,
    wherein the package further comprises a shield layer disposed between the top face and the back face inside the feed-through, and
    wherein at least one of the DC lines is electrically connected to the shield layer via a via-hole inside the feed-through.

2. The package according to claim 1,
    wherein at least another of the DC lines is disposed on the top face of the external portion and is adjacent to the at least one ground line.

3. The package according to claim 1,
    wherein another ground line is disposed adjacent the other side of the at least one of the DC lines.

4. The package according to claim 1, further comprising a ground layer disposed between the top face and the back face inside the feed-through,
    wherein the ground lines of the top face and the back face of the external portion are electrically connected to the ground layer via a via-hole inside the feed-through.

5. The package according to claim 4,
    wherein the ground lines of the back face are provided surrounding the transmission lines on the back face.

6. The package according to claim 1,
    wherein a plurality of shield patterns is provided in the shield layer, the shield patterns being arranged side by side between edges of the back face.

7. The package according to claim 6,
    wherein the shield patterns are arranged in a line of more than two by a side wall along each other.

8. The package according to claim 7,
    wherein one of the DC lines is electrically connected to one of the lines of the shield patterns via a via-hole inside the feedthrough,
    wherein another of the DC lines is electrically connected to another of the lines of the shield patterns via a via-hole inside the feedthrough, and
    wherein the another of the DC lines is disposed adjacent to one of the DC lines on the first top face.

9. The package according to claim 7,
    wherein a width of the shield pattern of one of the lines is different from a width of the shield pattern of another of the lines.

* * * * *